US012793175B2

(12) United States Patent
Zhu et al.

(10) Patent No.: US 12,793,175 B2
(45) Date of Patent: Nov. 10, 2026

(54) IMAGE SUPER-RESOLUTION METHOD, DEVICE, AND STORAGE MEDIUM

(71) Applicant: BOE Technology Group Co., Ltd., Beijing (CN)

(72) Inventors: Dan Zhu, Beijing (CN); Yan Gao, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 246 days.

(21) Appl. No.: 18/704,428

(22) PCT Filed: Mar. 6, 2023

(86) PCT No.: PCT/CN2023/079863
§ 371 (c)(1),
(2) Date: Apr. 24, 2024

(87) PCT Pub. No.: WO2024/182975
PCT Pub. Date: Sep. 12, 2024

(65) Prior Publication Data
US 2025/0238894 A1 Jul. 24, 2025

(51) Int. Cl.
*G06T 3/4053* (2024.01)
*G06T 3/4046* (2024.01)
(Continued)

(52) U.S. Cl.
CPC .......... *G06T 3/4053* (2013.01); *G06T 3/4046* (2013.01); *G06V 10/7715* (2022.01); *G06V 10/82* (2022.01)

(58) Field of Classification Search
CPC ....... G06T 3/4053; G06T 3/40; G06T 3/4046; G06V 10/82; G06V 10/7715
See application file for complete search history.

(56) References Cited

U.S. PATENT DOCUMENTS

2002/0076088 A1 6/2002 Tsai
2022/0084166 A1 * 3/2022 Navarrete Michelini .................. G06N 3/048

FOREIGN PATENT DOCUMENTS

CN 102831388 B 10/2015
CN 110852948 A * 2/2020 ........... G06T 3/4053
(Continued)

OTHER PUBLICATIONS

CN112070664 A Machine Translation (Year: 2020).*
(Continued)

*Primary Examiner* — Vu Le
*Assistant Examiner* — Jessica Yifang Lin
(74) *Attorney, Agent, or Firm* — IPro, PLLC

(57) ABSTRACT

An image super-resolution method, a device, and a storage medium are provided. The method includes: determining a super-resolution requirement including a requirement for converting an image with a first resolution into an image with a second resolution greater than the first resolution; and determining a preset image super-resolution network that meets the super-resolution requirement, and inputting a to-be-performed-super-resolution image with the first resolution into the preset image super-resolution network, to obtain a result image with the second resolution output by the preset image super-resolution network.

19 Claims, 3 Drawing Sheets

(51) Int. Cl.
*G06V 10/77* (2022.01)
*G06V 10/82* (2022.01)

(56) References Cited

FOREIGN PATENT DOCUMENTS

| | | | | | |
|---|---|---|---|---|---|
| CN | 111461973 | A | * | 7/2020 | G06F 18/253 |
| CN | 112070664 | A | * | 12/2020 | G06V 10/80 |
| CN | 113298717 | A | | 8/2021 | |
| CN | 113947609 | A | | 1/2022 | |
| CN | 114008664 | A | * | 2/2022 | G06N 3/045 |
| CN | 114283301 | A | | 4/2022 | |
| CN | 114359419 | A | | 4/2022 | |
| CN | 114897702 | A | | 8/2022 | |
| CN | 115620109 | A | * | 1/2023 | G06V 10/806 |
| CN | 112070664 | B | * | 11/2023 | H04N 19/63 |
| CN | 113298239 | B | * | 4/2024 | G06N 3/045 |
| JP | 6922005 | B2 | * | 8/2021 | G06T 7/10 |
| KR | 20220085280 | A | * | 6/2022 | G06N 3/04 |
| WO | WO-2021073493 | A1 | * | 4/2021 | G06N 3/045 |

OTHER PUBLICATIONS

CN 115620109 A Machine Translation (Year: 2023).*

WO 2021073493 A1 Machine Translation (Year: 2021).*

KR 20220085280 A Machine Translation (Year: 2022).*

Lu, Enmin and Xiaoxiao Hu. "Image super-resolution via channel attention and spatial attention." Applied Intelligence 52 (2021): 2260-2268. (Year: 2021).*

PCT/CN2023/079863 international search report dated Nov. 17, 2023.

PCT/CN2023/079863 Written Opinion dated Nov. 17, 2023.

* cited by examiner

IMAGE SUPER-RESOLUTION METHOD, DEVICE, AND STORAGE MEDIUM

CROSS-REFERENCE TO RELATED APPLICATIONS

The present disclosure is a U.S. national phase of PCT Application No. PCT/CN2023/079863 filed on Mar. 6, 2023 which is hereby incorporated by reference in its entirety.

TECHNICAL FIELD

The present disclosure relates to a technical field of image processing, and in particular to an image super-resolution method and apparatus, a device, and a storage medium.

BACKGROUND

At present, development of many services requires devices to perform image super-resolution. For example, when conducting a video conference, usually, a sending device reduces resolution of collected video frames for network transmission, and then a receiving device performs the super-resolution on received video frames with low-resolutions to improve the resolution of the video frames, thereby improving a clarity degree of the video conference.

However, computing cost required by the device to perform the image super-resolution is often high.

SUMMARY

The present disclosure provides an image super-resolution method and apparatus, device, and a storage medium, to solve defects in the related technology.

According to a first aspect of embodiments of the present disclosure, an image super-resolution method is provided. The method includes:

determining a super-resolution requirement including a requirement for converting an image with a first resolution into an image with a second resolution greater than the first resolution; and determining a preset image super-resolution network that meets the super-resolution requirement, and inputting a to-be-performed-super-resolution image with the first resolution into the preset image super-resolution network, to obtain a result image with the second resolution output by the preset image super-resolution network;

where the preset image super-resolution network is configured for extracting one or more image features based on a preset channel attention module;

the preset channel attention module is configured for: determining one or more initial weights for one or more channel images according to an input feature map, taking one or more initial weights that meet a preset weight condition as one or more result weights, and outputting a result feature map according to the determined result weights.

Optionally, a minimum absolute value of the determined result weights is greater than or equal to a maximum absolute value of the initial weights that do not meet the preset weight condition.

Optionally, an initial weight that meets the preset weight condition includes at least one of:

an absolute value of the initial weight being greater than a preset weight lower limit;

a sequence number of the initial weight being less than a preset sequence number where the initial weights are sorted in a sequence of absolute values from large to small; or the sequence number of the initial weight being in atop N % where the initial weights are sorted in the sequence of absolute values from large to small.

Optionally, outputting the result feature map according to the determined result weights includes:

obtaining corresponding single-channel feature maps by computing products of the determined result weights with corresponding channel images respectively; and obtaining the result feature map by stacking the obtained single-channel feature maps.

Optionally, determining the one or more initial weights for the one or more channel images according to the input feature map includes at least one of:

extracting features from the input feature map, to obtain the initial weights for the channel images;

performing a pooling process on the input feature map to obtain a pooling result, and extracting features from the obtained pooling result to obtain the initial weights for the channel images; or extracting the features for the input feature map, performing the pooling process on the extracted features to obtain a pooling result, and extracting features from the obtained pooling result to obtain the initial weights for the channel images.

Optionally, the pooling process includes at least one of:

performing a global maximum pooling process;

performing a global average pooling process; or performing the global maximum pooling process and the global average pooling process respectively to obtain two pooling features, and then stacking the obtained two pooling features.

Optionally, determining the preset image super-resolution network that meets the super-resolution requirement includes:

determining an original image super-resolution network, where the original image super-resolution network is configured for extracting image features from an input image with the first resolution and outputting a result image with the second resolution according to the extracted image features; and performing a preset process on the original image super-resolution network to obtain the preset image super-resolution network that meets the super-resolution requirement.

Optionally, the original image super-resolution network is specifically configured for extracting the image features based on an original channel attention module;

where the original channel attention module is configured for determining the initial weights for the channel images according to the input feature map, and outputting an original feature map according to the determined initial weights; and where the preset process includes: converting one or more original channel attention modules in the original image super-resolution network into preset channel attention modules by configuring a preset weight condition for each of the original channel attention modules according to the super-resolution requirement, such that a preset image super-resolution network obtained by the converting meets the super-resolution requirement.

Optionally, the super-resolution requirement further includes a computing power limit requirement;

where determining the original image super-resolution network includes:

determining an original channel module number upper limit according to the computing power limit requirement in the super-resolution requirement, and determining an original image super-resolution network that meets the super-resolution requirement;

where the number of the original channel attention modules included in the original image super-resolution network is less than or equal to the original channel module number upper limit.

Optionally, the super-resolution requirement further includes a computing power limit requirement;

where converting the one or more original channel attention modules in the original image super-resolution network into the preset channel attention modules by configuring the preset weight condition for each of the original channel attention modules includes:

determining a number M of to-be-converted channel modules according to the computing power limit requirement in the super-resolution requirement; and converting M original channel attention modules in the original image super-resolution network into M preset channel attention modules by configuring the preset weight condition for each of the M original channel attention modules.

Optionally, the super-resolution requirement further includes a computing power limit requirement;

wherein converting the one or more original channel attention modules in the original image super-resolution network into the preset channel attention modules by configuring the preset weight condition for each of the original channel attention modules includes:

according to the computing power limit requirement in the super-resolution requirement, determining a number M of to-be-converted original channel attention modules and a channel image retention ratio for each of the to-be-converted original channel attention modules; and converting M original channel attention modules in the original image super-resolution network into M preset channel attention modules by configuring the preset weight condition for each of the M original channel attention modules according to a corresponding channel image retention ratio;

where an initial weight that meets the preset weight condition includes: a sequence number of the initial weight being in a top N % where the initial weights are sorted in a sequence of absolute values from large to small, where N % is the corresponding channel image retention ratio.

Optionally, the super-resolution requirement further includes a computing power limit requirement;

wherein determining the preset image super-resolution network that meets the super-resolution requirement includes:

determining a preset channel module number upper limit according to the computing power limit requirement in the super-resolution requirement, and determining a preset image super-resolution network that meets the super-resolution requirement;

where the number of preset channel attention modules included in the preset image super-resolution network is less than or equal to the preset channel module number upper limit.

Optionally, the super-resolution requirement further includes a computing power limit requirement;

wherein determining the preset image super-resolution network that meets the super-resolution requirement includes:

determining a channel image retention ratio for each of preset channel attention modules according to the computing power limit requirement in the super-resolution requirement, and determining a preset image super-resolution network that meets the super-resolution requirement;

where for each preset channel attention module in the preset image super-resolution network, an initial weight that meets the preset weight condition for the preset channel attention module includes: a sequence number of the initial weight being in a top N % where the initial weights are sorted in a sequence from large to small, where N % is the corresponding channel image retention ratio.

Optionally, the preset image super-resolution network being trained includes an original convolution layer;

where the original convolution layer is configured for extracting convolution features from the input feature map through at least two branches respectively to obtain at least two branch convolution feature maps, and outputting a sum of the obtained branch convolution feature maps.

Optionally, at least one branch in the original convolution layer includes: a direction convolution layer configured for extracting inter-pixel gradient features in a preset direction.

Optionally, the preset image super-resolution network includes a preset convolutional layer;

where the preset convolution layer is obtained by performing a merging process on a trained preset image super-resolution network;

where the merging process includes: obtaining a corresponding preset convolution layer by performing merging operation on the at least two branches of the original convolution layer in the trained preset image super-resolution network;

where the preset convolution layer is configured for performing a single convolution operation on the input feature map, and outputting a sum of at least two branch result feature maps in a corresponding original convolution layer.

Optionally, an input of at least one preset channel attention module includes the output of the preset convolutional layer.

Optionally, extracting image features from an input image with the first resolution, and outputting a result image with the second resolution according to the extracted image features includes:

extracting image features from an input image with the first resolution; obtaining a first intermediate image with the second resolution according to the extracted image features; performing a preset computing operation on the input image with the first resolution, to obtain a second intermediate image with the second resolution; and outputting the result image with the second resolution according to a sum of the first intermediate image and the second intermediate image.

Optionally, the method is applied to a computing device, and the preset image super-resolution network is deployed in the computing device.

According to a second aspect of embodiments of the present disclosure, an image super-resolution apparatus is provided. The apparatus includes:

a requirement unit, configured for determining a super-resolution requirement including a requirement for converting an image with a first resolution into an image with a second resolution greater than the first resolution; and a network unit, configured for determining a preset image super-resolution network that meets the super-resolution requirement;

a result unit, configured for inputting a to-be-performed-super-resolution image with the first resolution into the preset image super-resolution network, to obtain a result image with the second resolution output by the preset image super-resolution network;

where the preset image super-resolution network is configured for extracting one or more image features based on a preset channel attention module;

the preset channel attention module is configured for: determining one or more initial weights for one or more channel images according to an input feature map, taking one or more initial weights that meet a preset weight condition as one or more result weights, and outputting a result feature map according to the determined result weights.

Optionally, a minimum absolute value of the determined result weights is greater than or equal to a maximum absolute value of the initial weights that do not meet the preset weight condition.

Optionally, an initial weight that meets the preset weight condition includes at least one of an absolute value of the initial weight being greater than a preset weight lower limit;

a sequence number of the initial weight being less than a preset sequence number where the initial weights are sorted in a sequence of absolute values from large to small; or the sequence number of the initial weight being in a top N % where the initial weights are sorted in the sequence of absolute values from large to small.

Optionally, the preset channel attention module is configured for:

obtaining corresponding single-channel feature maps by computing products of the determined result weights with corresponding channel images respectively; and obtaining the result feature map by stacking the obtained single-channel feature maps.

Optionally, the preset channel attention module is configured for determining the initial weights for the channel images by at least one of extracting features from the input feature map, to obtain the initial weights for the channel images;

performing a pooling process on the input feature map to obtain a pooling result, and extracting features from the obtained pooling result to obtain the initial weights for the channel images; or extracting the features for the input feature map, performing the pooling process on the extracted features to obtain a pooling result, and extracting features from the obtained pooling result to obtain the initial weights for the channel images.

Optionally, the pooling process includes at least one of:

performing a global maximum pooling process;

performing a global average pooling process; or performing the global maximum pooling process and the global average pooling process respectively to obtain two pooling features, and then stacking the obtained two pooling features.

Optionally, the network unit is configured for:

determining an original image super-resolution network, where the original image super-resolution network is configured for extracting image features from an input image with the first resolution and outputting a result image with the second resolution according to the extracted image features; and performing a preset process on the original image super-resolution network to obtain the preset image super-resolution network that meets the super-resolution requirement.

Optionally, the original image super-resolution network is specifically configured for extracting the image features based on an original channel attention module;

the original channel attention module is configured for determining the initial weights for the channel images according to the input feature map, and outputting an original feature map according to the determined initial weights; and the preset process includes: converting one or more original channel attention modules in the original image super-resolution network into preset channel attention modules by configuring a preset weight condition for each of the original channel attention modules according to the super-resolution requirement, such that a preset image super-resolution network obtained by the converting meets the super-resolution requirement.

Optionally, the super-resolution requirement further includes a computing power limit requirement;

the network unit is configured for:

determining an original channel module number upper limit according to the computing power limit requirement in the super-resolution requirement, and determining an original image super-resolution network that meets the super-resolution requirement;

where the number of the original channel attention modules included in the original image super-resolution network is less than or equal to the original channel module number upper limit.

Optionally, the super-resolution requirement further includes a computing power limit requirement;

the preset process includes:

determining a number M of to-be-converted channel modules according to the computing power limit requirement in the super-resolution requirement; and converting M original channel attention modules in the original image super-resolution network into M preset channel attention modules by configuring the preset weight condition for each of the M original channel attention modules.

Optionally, the super-resolution requirement further includes a computing power limit requirement;

the preset process includes:

according to the computing power limit requirement in the super-resolution requirement, determining a number M of to-be-converted original channel attention modules and a channel image retention ratio for each of the to-be-converted original channel attention modules; and converting M original channel attention modules in the original image super-resolution network into M preset channel attention modules by configuring the preset weight condition for each of the M original channel attention modules according to a corresponding channel image retention ratio;

where an initial weight that meets the preset weight condition includes: a sequence number of the initial weight being in a top N % where the initial weights are sorted in a sequence of absolute values from large to small, where N % is the corresponding channel image retention ratio.

Optionally, the super-resolution requirement further includes a computing power limit requirement;

the network unit is configured for:

determining a preset channel module number upper limit according to the computing power limit requirement in the super-resolution requirement, and determining a preset image super-resolution network that meets the super-resolution requirement;

where the number of preset channel attention modules included in the preset image super-resolution network is less than or equal to the preset channel module number upper limit.

Optionally, the super-resolution requirement further includes a computing power limit requirement;

the network unit is configured for:

determining a channel image retention ratio for each of preset channel attention modules according to the computing power limit requirement in the super-resolution requirement, and determining a preset image super-resolution network that meets the super-resolution requirement;

where for each preset channel attention module in the preset image super-resolution network, an initial weight that meets the preset weight condition for the preset channel attention module includes: a sequence number of the initial weight being in a top N % where the initial weights are sorted in a sequence from large to small, where N % is the corresponding channel image retention ratio.

Optionally, the preset image super-resolution network being trained includes an original convolution layer;

the original convolution layer is configured for extracting convolution features from the input feature map through at least two branches respectively to obtain at least two branch convolution feature maps, and outputting a sum of the obtained branch convolution feature maps.

Optionally, at least one branch in the original convolution layer includes: a direction convolution layer configured for extracting inter-pixel gradient features in a preset direction.

Optionally, the preset image super-resolution network includes a preset convolutional layer;

the preset convolution layer is obtained by performing a merging process on a trained preset image super-resolution network;

the merging process includes: obtaining a corresponding preset convolution layer by performing merging operation on the at least two branches of the original convolution layer in the trained preset image super-resolution network;

the preset convolution layer is configured for performing a single convolution operation on the input feature map, and outputting a sum of at least two branch result feature maps in a corresponding original convolution layer.

Optionally, an input of at least one preset channel attention module includes the output of the preset convolutional layer.

Optionally, the preset image super-resolution network is configured for:

extracting image features from an input image with the first resolution; obtaining a first intermediate image with the second resolution according to the extracted image features; performing a preset computing operation on the input image with the first resolution, to obtain a second intermediate image with the second resolution; and outputting the result image with the second resolution according to a sum of the first intermediate image and the second intermediate image.

Optionally, the apparatus is applied to a computing device, and the preset image super-resolution network is deployed in the computing device.

According to the above embodiments, for the channel attention module in the preset image super-resolution network, the result weight is screened through the preset weight condition, to compute the result feature map, such that the computing resources may be saved by reducing the number of weights participating in computing to reduce the computing cost.

It should be understood that the above general description and the detailed description in the following text are only exemplary and explanatory, and cannot limit the present disclosure.

BRIEF DESCRIPTION OF DRAWINGS

Accompanying drawings here are incorporated into the description and form a part of this description, show embodiments conforming to the present disclosure and are used together with the description to explain principles of the present disclosure.

DETAILED DESCRIPTION

Figure 1:
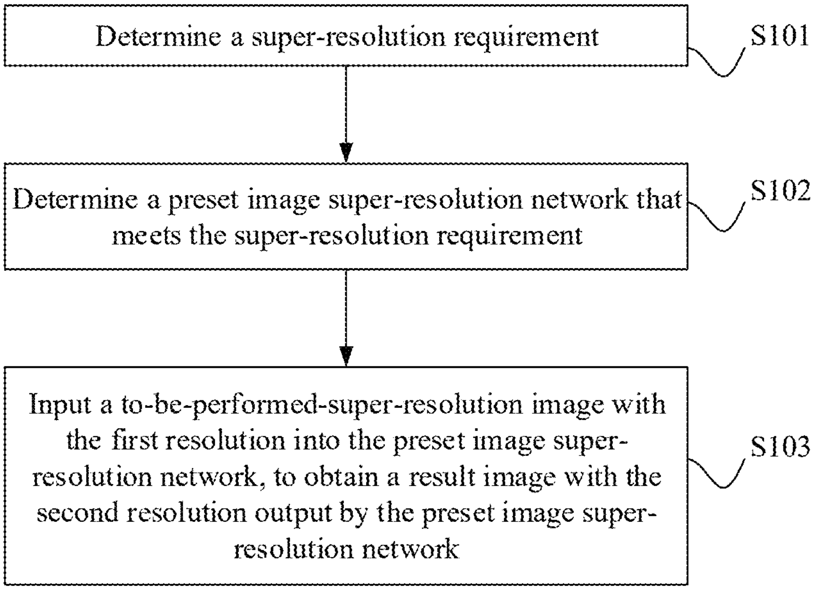
FIG. 1 is a schematic flowchart of an image super-resolution method shown according to an embodiment of the present disclosure.

Exemplary embodiments will be described in details herein, with examples thereof represented in the accompanying drawings. When the following description involves the accompanying drawings, same numerals in different figures represent same or similar elements unless otherwise indicated. Implementations described in the following exemplary embodiments do not represent all implementations consistent with the present disclosure. Rather, they are merely examples of apparatuses and methods consistent with some aspects of the present disclosure as detailed in the appended claims.

At present, development of many services requires devices to perform image super-resolution. For example, when conducting a video conference, usually, a sending device reduces resolution of collected video frames for network transmission, and then a receiving device performs the super-resolution on received video frames with low-resolutions to improve the resolution of the video frames, thereby improving a clarity degree of the video conference.

However, computing cost required by the device to perform the image super-resolution is often high.

Since the device usually requires higher computing cost to perform the image super-resolution, it is often difficult for a device with less computing resources to perform the image super-resolution locally.

In addition, for a part of stronger real-time services (for example, real-time transmission services such as video conferences, live broadcasts, etc.), the computing cost required for the real-time image super-resolution is higher, and then it is difficult for the device (for example, a user terminal such as a mobile phone, a notebook, etc.) with the less computing resources to perform locally the image super-resolution.

In a specific example, when a user uses a mobile phone to start a video conference, it is often necessary for the mobile phone to consume larger computing cost, to achieve the real-time image super-resolution and improve the clarity degree of the video conference.

To address shortcomings in the above related technologies, an embodiment of the present disclosure provides an image super-resolution method.

In this method, firstly, it is found that the image super-resolution may be performed by using a channel attention mechanism. Specifically, a channel attention module for implementing the channel attention mechanism may be configured in an image super-resolution network, and then image features may be extracted, by using the channel attention mechanism, for the image super-resolution.

Further, weights are determined for channel images of the feature map in the channel attention mechanism, and the determined weights may reflect importance degrees of the channel images to some extent.

In order to reduce the computing cost and save the computing resources, the number of channel images in the channel attention mechanism may be reduced, and specifically, some less important channel images may be discarded according to the determined weights, and these channel images do not participate in subsequent computing, such that the computing resources are saved without affecting the effect of the image super-resolution as much as possible.

Therefore, the method may reduce the number of channel images, save the computing resources, and reduce the computing cost for the channel attention module in the image super-resolution network. Further, the less important channel images may be reduced according to the weights, corresponding to the channel images, determined by the channel attention module, such that the computing resources may be saved and the computing cost may be reduced without affecting the effect of the image super-resolution as much as possible.

The image super-resolution method shown according to an embodiment of the present disclosure will be explained in detail below with reference to the accompanying drawings.

As shown in FIG. 1, FIG. 1 is a schematic flowchart of an image super-resolution method shown according to an embodiment of the present disclosure.

A flow of the method does not limit a specific execution body.

Optionally, the flow of the method may be performed by any electronic device.

Optionally, specifically, the flow of the method may be performed by a user terminal, a user device, a server, or another electronic device.

The flow of the method may include following steps S101-S103.

At step S101, a super-resolution requirement is determined.

Optionally, the super-resolution requirement may include: converting an image with a first resolution into an image with a second resolution greater than the first resolution.

At step S102, a preset image super-resolution network that meets the super-resolution requirement is determined.

At step S103, a to-be-performed-super-resolution image with the first resolution is input into the preset image super-resolution network, to obtain a result image with the second resolution output by the preset image super-resolution network.

Optionally, the preset image super-resolution network may be configured for: extracting image features from an input image with the first resolution, and outputting a result image with the second resolution according to the extracted image features.

Optionally, extracting the image features may include: extracting the image features based on a preset channel attention module. In other words, the preset image super-resolution network may be configured for extracting the image features based on the preset channel attention module. In the process of extracting the image features, the preset image super-resolution network may use the preset channel attention module to extract the image features.

Optionally, the preset channel attention module may be configured for: determining one or more initial weights for one or more channel images according to an input feature map, taking one or more initial weights that meet a preset weight condition as one or more result weights, and outputting a result feature map according to the determined result weights.

The flow of the method does not limit a specific form and source of the to-be-performed-super-resolution image.

Optionally, the to-be-performed-super-resolution image may be a video frame for implementing video super-resolution. Specifically, for one or more video frames in a video, step S103 may be performed respectively to improve the resolution, thereby improving the clarity degree and quality of the video.

Optionally, the to-be-performed-super-resolution image may also be a blurred image, and the clarity degree of the image may be improved by performing the image super-resolution based on step S103.

Optionally, in a case where the result image is obtained, the result image may be further output to the terminal.

Optionally, the above flow of the method may be performed at a remote terminal, such that after the image super-resolution is completed, the remote terminal may output the result image to the terminal. The terminal here may specifically include a terminal device, or may include a terminal client.

For example, a server may perform the image super-resolution, and then output the result image to the terminal client or the terminal device of the user.

Optionally, the process of the image super-resolution in the above flow of the method may be performed locally at the execution body, such that the execution body may, after performing the image super-resolution, output the result image to a local terminal client. The terminal here may specifically include the terminal client.

For example, after the device locally receives the transmitted image with a low-resolution, a local processor may perform the above flow of the method, and then output an image with a high-resolution, obtained after performing the image super-resolution, to the local terminal client of the device for display. Certainly, the image may be specifically a video frame to implement enhancement of the quality of the video.

According to the flow of the method, for the channel attention module in the preset image super-resolution network, the result weight may be screened through the preset weight condition, to compute the result feature map, such that the computing resources may be saved by reducing the number of weights participating in computing to reduce the computing cost.

In an optional embodiment, the above flow of the method may be applied to a computing device, and the preset image super-resolution network may be deployed in the computing device, to make it convenient for the computing device to perform the above flow of the method.

In this embodiment, a specific computing device is not limited. Optionally, the computing device may include a terminal, a server, a mobile phone, a computer, an all-in-one conference machine, etc.

In this embodiment, the preset image super-resolution network is deployed on the computing device, to perform the image super-resolution method in the above flow of the method, such that the computing resources of the computing device performing the image super-resolution may be saved, to reduce the computing cost of the computing device performing the image super-resolution, and improve efficiency of the image super-resolution.

The above flow of the method is explained in detail from different aspects below.

I. Regarding the Preset Channel Attention Module.

1. Initial Weight.

In an optional embodiment, for convenience of description, a weight determined by the preset channel attention module for the channel image is described as an initial weight. This concept is to distinguish from a result weight obtained after filtering subsequently.

Optionally, the initial weight may represent evaluation and prediction of the preset channel attention module on the importance degree of the channel image.

Optionally, the preset channel attention module may determine an initial weight/initial weights for one or more channel images in the input feature map; or the preset channel attention module may determine an initial weight/initial weights for a part or all of the channel images in the input feature map.

Optionally, the preset channel attention module may determine a corresponding initial weight for a channel image in the input feature map; or the preset channel attention module may firstly further extract features for the input feature map, and then determine a corresponding initial weight for a channel image in the extracted features.

Optionally, the channel image configured for determining the initial weight may be directly obtained from the input feature map; or features may be firstly extracted for the input feature map, and then the channel image may be obtained from the extracted features.

For convenience of description, features extracted from the input feature map are described as an intermediate feature map. Therefore, optionally, the preset channel attention module may be configured for: determining an initial weight for a channel image in the input feature map and/or the intermediate feature map.

Of course, the channel image may also be described as a single-channel feature image.

The manner in which the preset channel attention module specifically determines the initial weight is not limited in the embodiment of the present disclosure.

Optionally, the features may be extracted for the input feature map to predict the initial weight for the channel image.

Optionally, pooling process may be performed firstly for the input feature map, and then features may be extracted for a pooling result, to predict the initial weight for the channel image.

In this embodiment, the manner of extracting the features is not limited. Optionally, specifically, the initial weight for the channel image may be predicted for the pooling result, by using a convolution layer, a fully connected layer, or other neural networks.

Optionally, the features may be extracted firstly for the input feature map, then the pooling process may be further performed for the extracted features, and then the features may be extracted for the pooling result, to predict the initial weight for the channel image.

In this embodiment, the manner of extracting the features is not limited. Optionally, specifically, the features may be extracted for the input feature map or the pooling result, by using a convolution layer, a fully connected layer, or other neural networks.

Combining the above plurality of manners of determining the initial weight, in an optional embodiment, determining the one or more initial weights for the one or more channel images according to the input feature map may include at least one of:

1) extracting features from the input feature map, to obtain the initial weights for the channel images;
2) performing a pooling process on the input feature map to obtain a pooling result, and extracting features from the obtained pooling result to obtain the initial weights for the channel images; or
3) extracting the features for the input feature map, performing the pooling process on the extracted features to obtain a pooling result, and extracting features from the obtained pooling result to obtain the initial weights for the channel images.

In this embodiment, the flexibility of the manners of determining the initial weight may be improved through the plurality of manners of determining the initial weight, which thereby adapts conveniently to different requirements. In addition, to-be-processed data amount may be reduced by introducing the pooling process, to improve efficiency of determining the initial weight.

Optionally, in the preset image super-resolution network, different preset channel attention modules may use different manners of determining the initial weight.

In this embodiment, a specific manner of pooling process and a specific manner of extracting the features are not limited.

Optionally, the pooling process may include at least one of: performing a global maximum pooling process; performing a global average pooling process; or performing the global maximum pooling process and the global average pooling process respectively to obtain two pooling features, and then stacking the obtained two pooling features.

Optionally, the global maximum pooling process may include taking a maximum value for elements in a channel image. Specifically, the channel image may be pooled into a maximum value of included elements.

Specifically, performing the global maximum pooling process on features (specifically, the features may be the input feature map, or features extracted from the input feature map) may include: taking a maximum value of all elements for one or more channel images in the features respectively. Specifically, a maximum value of all elements may be taken for all or a part of channel images in the features respectively. A size of a pooled channel image may be 1*1, and the pooled channel image includes the maximum value of the elements in the channel image.

Optionally, the global average pooling process may include taking an average value for elements in a channel image. Specifically, the channel image may be pooled into an average value of included elements.

Specifically, performing the global average pooling process on features (specifically, the features may be the input feature map, or features extracted from the input feature map) may include: taking an average value of all elements for one or more channel images in the features respectively. Specifically, an average value of all elements may be taken for all or a part of channel images in the features respectively. A size of a pooled channel image may be 1*1, and the pooled channel image includes the average value of the elements in the channel image.

Optionally, stacking the two pooling features may specifically include stacking channel images of the two pooling features, to increase the number of channels.

In this embodiment, the maximum value and the average value of the elements in the channel images may be introduced through stacking, such that data information amount for predicting and determining the initial weights is increased, and the accuracy of the initial weights is improved.

Certainly, the above examples of pooling process are merely used for exemplary description, and cannot limit the scope of the embodiments of the present disclosure.

In the above embodiment of the pooling process, the data amount may be reduced through a specific pooling process, such that the computing cost of subsequently predicting and determining the initial weights is reduced, and the computing efficiency is improved.

For explanation of extracting the features in the process of determining the initial weights, the specific manner of extracting the features is not limited in this embodiment.

In an optional embodiment, extracting the features may specifically include extracting the features by a convolution layer, a fully connected layer, or other neural networks. Specifically, the features may be extracted by a preset convolution layer. Explanation of the preset convolution layer may refer to the following.

Optionally, the process of determining the initial weights may include: extracting the features from the input feature map to obtain the initial weights for the channel images.

Specifically, the features may be extracted by the fully connected layer (the convolution layer or other neural networks) for the input feature map, to obtain an initial weight, corresponding to a channel image in the input feature map, output by the fully connected layer (the convolution layer or other neural networks). Specifically, an initial weight for each of channel images in the input feature map may be obtained.

Optionally, the process of determining the initial weight may include: performing a pooling process on the input feature map to obtain a pooling result, and extracting features from the obtained pooling result to obtain the initial weights for the channel images.

Extracting the features for the pooling result may specifically include: inputting the pooling result to the fully connected layer (the convolution layer or other neural networks) to extract the features, to obtain an initial weight, corresponding to a channel image in the input feature map, output by the fully connected layer (the convolution layer or other neural networks).

Optionally, the process of determining the initial weight may include: extracting the features for the input feature map, performing a pooling process on the extracted features to obtain a pooling result, and extracting features from the obtained pooling result to obtain the initial weights for the channel images.

Specifically, the features may be extracted by the fully connected layer (the convolution layer or other neural networks) for the input feature map, to obtain an intermediate feature map output by the fully connected layer (the convolution layer or other neural networks). Extracting the features for the pooling result may specifically include: inputting the pooling result to the fully connected layer (the convolution layer or other neural networks) to extract the features, to obtain an initial weight, corresponding to a channel image in the intermediate feature map, output by the fully connected layer (the convolution layer or other neural networks).

2. Preset Weight Condition.

After the initial weights are determined, a result weight/result weights that meets/meet a preset weight condition may be screened from the initial weights according to the preset weight condition.

The specific preset weight condition is not limited in the embodiments of the present disclosure.

In an optional embodiment, to reduce the impact of the reduced number of channel images on the effect of the image super-resolution as much as possible, a channel image/channel images with a higher importance degree may be selected by configuring the preset weight condition, and a channel image/channel images with a lower importance degree may be screened and removed.

Since the determined initial weights have a negative number, to facilitate screening, the screening may be performed according to absolute values of the initial weights.

Optionally, in this embodiment, the specific preset weight condition is not limited, as long as a minimum absolute value of the determined result weights is greater than or equal to a maximum absolute value of the initial weights that do not meet the preset weight condition.

In other words, in this embodiment, initial weights with a larger absolute value may be selected as result weights, by configuring a preset weight condition, for subsequent computing, and initial weights with a smaller absolute value may be discarded and not participate in the subsequent computing, such that channel images (that is, channel images with a lower importance degree) corresponding to the initial weights with a smaller absolute value does not participate in the subsequent computing, to reduce the computing cost.

For convenience of understanding, specific examples of the preset weight condition are given below.

Optionally, the preset weight condition may include at least one of: an absolute value of the initial weight being greater than a preset weight lower limit; a sequence number of the initial weight being less than a preset sequence number where the initial weights are sorted in a sequence of absolute values from large to small; or the sequence number of the initial weight being in a top N % where the initial weights are sorted in the sequence of absolute values from large to small.

The specific preset weight lower limit, preset sequence number, and N value are not limited, and the specific manners of configuring the preset weight lower limit, preset sequence number, and N value are not limited.

Optionally, in the preset image super-resolution network, different preset channel attention modules may use different preset weight conditions.

Optionally, the preset weight condition may be configured automatically by a machine according to actual requirements, or may be customized by a user. Specifically, the preset weight condition may be configured according to a computing power limit of the device itself.

In an optional example, computing amount to be saved by the preset channel attention module may be determined according to the computing power limit requirement, and the ratio of the number of to-be-reduced channel images may be further determined, to obtain the ratio N % of the number of the channel images that can be retained, and then an initial weight that meets the preset weight condition may include: a sequence number of the initial weight being in a top N % where the initial weights are sorted in a sequence of absolute values from large to small.

Of course, the above preset weight condition is merely used for exemplary description.

In this embodiment, a result weight standard may be configured through a specific limited preset weight condition, such that the efficiency of determining the result weights the may be conveniently improved, and the saved computing power resources and computing cost may be conveniently determined through the configured standard. The result weight standard in the preset weight condition may also be configured according to the limit of the computing power resources or the to-be-saved computing cost, to fit a corresponding requirement.

3. Result Weight.

In embodiments of the present disclosure, for convenience of distinguishing from the initial weights and for convenience of description, initial weights that meet the preset weight condition are described as result weights.

Optionally, since there may be one or more preset weight conditions, initial weights that meet a part or all of the preset weight conditions may be determined as the result weights, or initial weights that meet the one or more preset weight conditions may be determined as the result weights.

After the result weights are determined, the manner of outputting the result feature map according to the result weights is not limited in the embodiments of the present disclosure.

Optionally, specifically, the result feature map may be obtained according to products of the result weights and corresponding channel images; or the initial weights that do not meet the preset weight condition may be configured to 0, and the result feature map may be further obtained according to the products of the result weights and the corresponding channel images and products of the other initial weights and corresponding channel images; or convolution is further performed for the products of the result weights and the corresponding channel images, through the convolution layer, to extract features to obtain the result feature map.

Optionally, outputting the result feature map according to the determined result weights may include: obtaining corresponding single-channel feature maps by computing products of the determined result weights with corresponding channel images respectively; and obtaining the result feature map by stacking the obtained single-channel feature maps.

In this embodiment, the efficiency of computing the result feature map may be improved by directly computing the products of the result weights and the corresponding channel images.

In addition, the process of determining the result feature map does not involve the initial weights that do not meet the preset weight condition and the corresponding channel images, such that the number of channel images in the result feature map may be less than the total number of the initial weights, thereby reducing the data amount and the computing amount, improving the efficiency of the image super-resolution, and reducing the computing cost.

Determining, when the initial weights is determined, the initial weights corresponding to the channel images in the input feature map is taken as an example, by screening the result weights, the number of the channel images in the result feature map may be less than the number of the channel images in the input feature map, such that the data amount and the computing amount may be reduced, the efficiency of the image super-resolution may be improved, and the computing cost may be reduced.

4. Structure of the Preset Channel Attention Module.

The specific structure of the preset channel attention module is not limited in the embodiments of the present disclosure.

It is to be noted that, optionally, different preset channel attention modules may have same or different structures, or may have different specific implementations. Specifically, the different preset channel attention modules may have same or different methods of determining the initial weight, or may have same or different preset weight conditions, or may have same or different methods of determining the result feature map.

Figure 2:
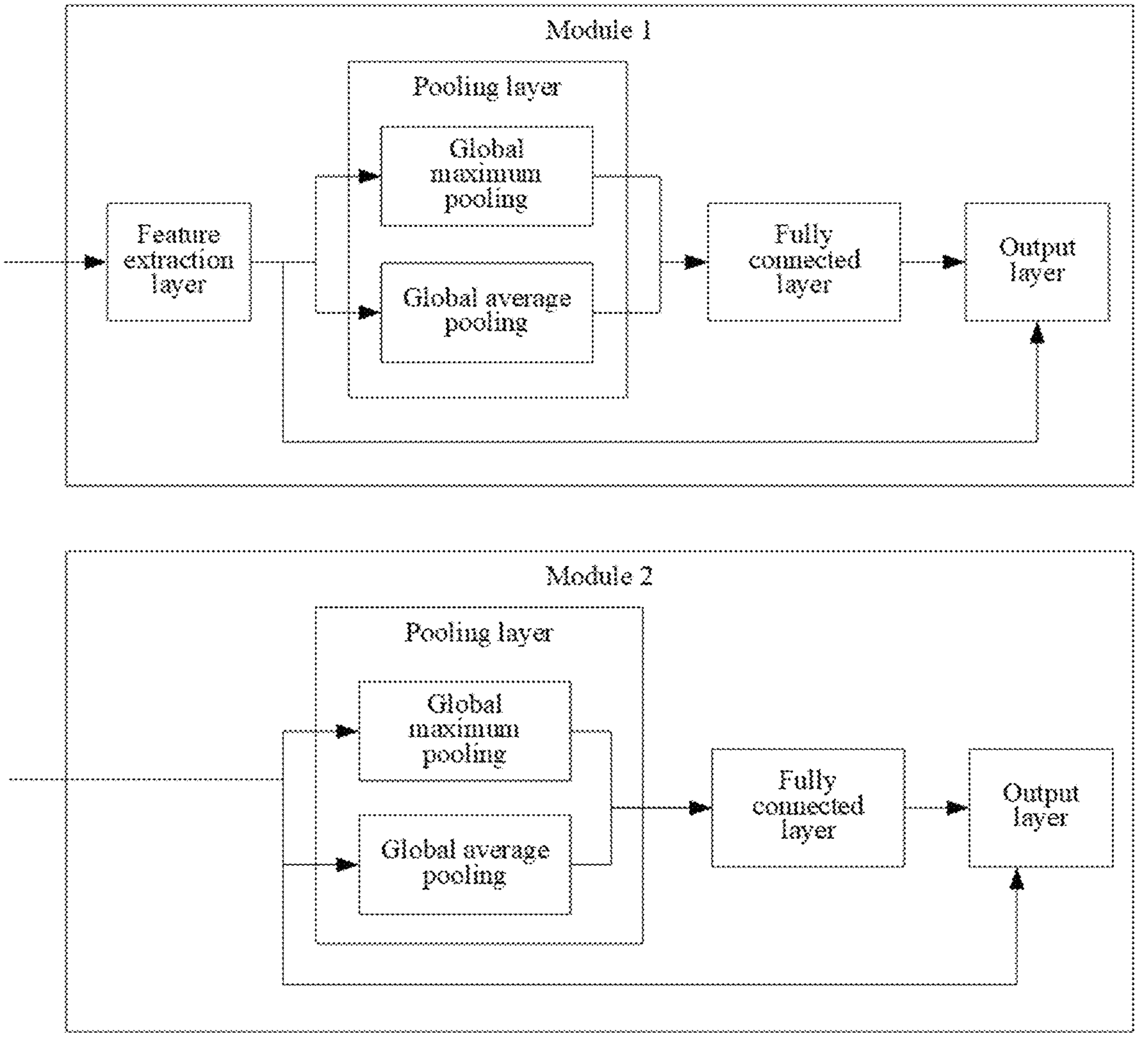
FIG. 2 is a schematic structural diagram of a preset channel attention module shown according to an embodiment of the present disclosure.

For convenience of understanding, as shown in FIG. 2, FIG. 2 is a schematic structural diagram of a preset channel attention module shown according to an embodiment of the present disclosure.

FIG. 2 shows two different preset channel attention modules (modules 1-2).

The module 1 includes a feature extraction layer, a pooling layer, a fully connected layer, and an output layer.

The module 2 includes a pooling layer, a fully connected layer, and an output layer.

The module 1 may input an input feature map into the feature extraction layer to extract an intermediate feature map, then may input the intermediate feature map into the pooling layer to obtain respectively a first pooling feature and a second pooling feature though global maximum pooling and global average pooling in the pooling layer, and then may stack the first pooling feature and the second pooling feature and input the first pooling feature and the second pooling feature into the fully connected layer to obtain initial weights, corresponding to channel images in the intermediate feature map, output by the fully connected layer.

Then, the module 1 inputs the initial weights and the intermediate feature map into the output layer, screens result weights by using a preset weight condition, then stacks products of each of the result weights and corresponding channel images in the intermediate feature map into a feature map, determines the feature map as a result feature map, and outputs the result feature map.

The module 2 may input an input feature map into the pooling layer to obtain respectively a third pooling feature and a fourth pooling feature though global maximum pooling and global average pooling in the pooling layer, and then may stack the third pooling feature and the fourth pooling feature and input the third pooling feature and the fourth second pooling feature into the fully connected layer to obtain initial weights, corresponding to channel images in the input feature map, output by the fully connected layer.

Then, the module 2 inputs the initial weights and the input feature map into the output layer, screens result weights by using a preset weight condition, then stacks products of each of the result weights and corresponding channel images in the input feature map into a feature map, determines the feature map as a result feature map, and outputs the result feature map.

It should be noted that the structure of the above preset channel attention module is merely used for exemplary description and cannot limit the scope of the embodiments of the present disclosure.

II. Regarding the Preset Image Super-Resolution Network.

1. A Structure of the Preset Image Super-Resolution Network.

A specific structure of the preset image super-resolution network is not limited in the embodiments of the present disclosure.

In an optional embodiment, as long as the preset image super-resolution network can meet the super-resolution requirement and include the preset channel attention module, the number of channel images can be reduced when extracting the image features.

Modules included in the preset image super-resolution network are also not specifically limited in the embodiments of the present disclosure.

Optionally, the preset image super-resolution network may include at least: a preset channel attention module and a super-resolution module for image super-resolution.

Optionally, the preset image super-resolution network may further include at least one of: a convolution layer, a spatial attention module, a feature extraction module, an activation function module, an upsampling module, a fully connected layer, a truncation module for limiting a value range (for example, a value range of an image pixel value), etc.

The number, sequence, and combination of respective modules in the preset image super-resolution network are not limited in the embodiments of the present disclosure.

For convenience of understanding, in an optional embodiment, the preset image super-resolution network may be configured for implementing feature extraction and upsampling.

Optionally, the step of the feature extraction may be implemented by the convolution layer, the preset attention module, the spatial attention module, the fully connected layer, the activation function module, etc.

Optionally, the upsampling may be implemented by the convolution layer and the upsampling module, etc.

In addition, optionally, the preset image super-resolution network may further implement the image super-resolution in a plurality of different manners, and finally synthesize an image super-resolution result in each of the manners to obtain a final output result.

Optionally, the preset image super-resolution network may be configured for: extracting image features from an input image with the first resolution; obtaining a first intermediate image with the second resolution according to the extracted image features; performing a preset computing operation on the input image with the first resolution, to obtain a second intermediate image with the second resolution; and outputting the result image with the second resolution according to a sum of the first intermediate image and the second intermediate image.

In this embodiment, the preset computing operation is not limited to a specific manner.

Optionally, the preset computing operation may be any image super-resolution manner, and the super-resolution may be performed on the input image with the first resolution into an image with the second resolution. The preset computing operation may specifically include at least one of: super-resolution interpolation methods, such as nearest neighbour interpolation, bilinear interpolation, bicubic interpolation, etc.

Optionally, outputting the result image with the second resolution according to the sum of the first intermediate image and the second intermediate image may specifically include: determining the sum of the first intermediate image and the second intermediate image as the result image with the second resolution; or performing feature extraction for the sum of the first intermediate image and the second intermediate image to obtain the result image with the second resolution.

In this embodiment, by configuring the structure of the network, an effect of super-resolution of the preset image super-resolution network may be improved, training difficulty and convergence difficulty may be reduced, and training efficiency may be improved.

For convenience of understanding, an embodiment of the present disclosure provides an example of a structure of a preset image super-resolution network.

Figure 3:
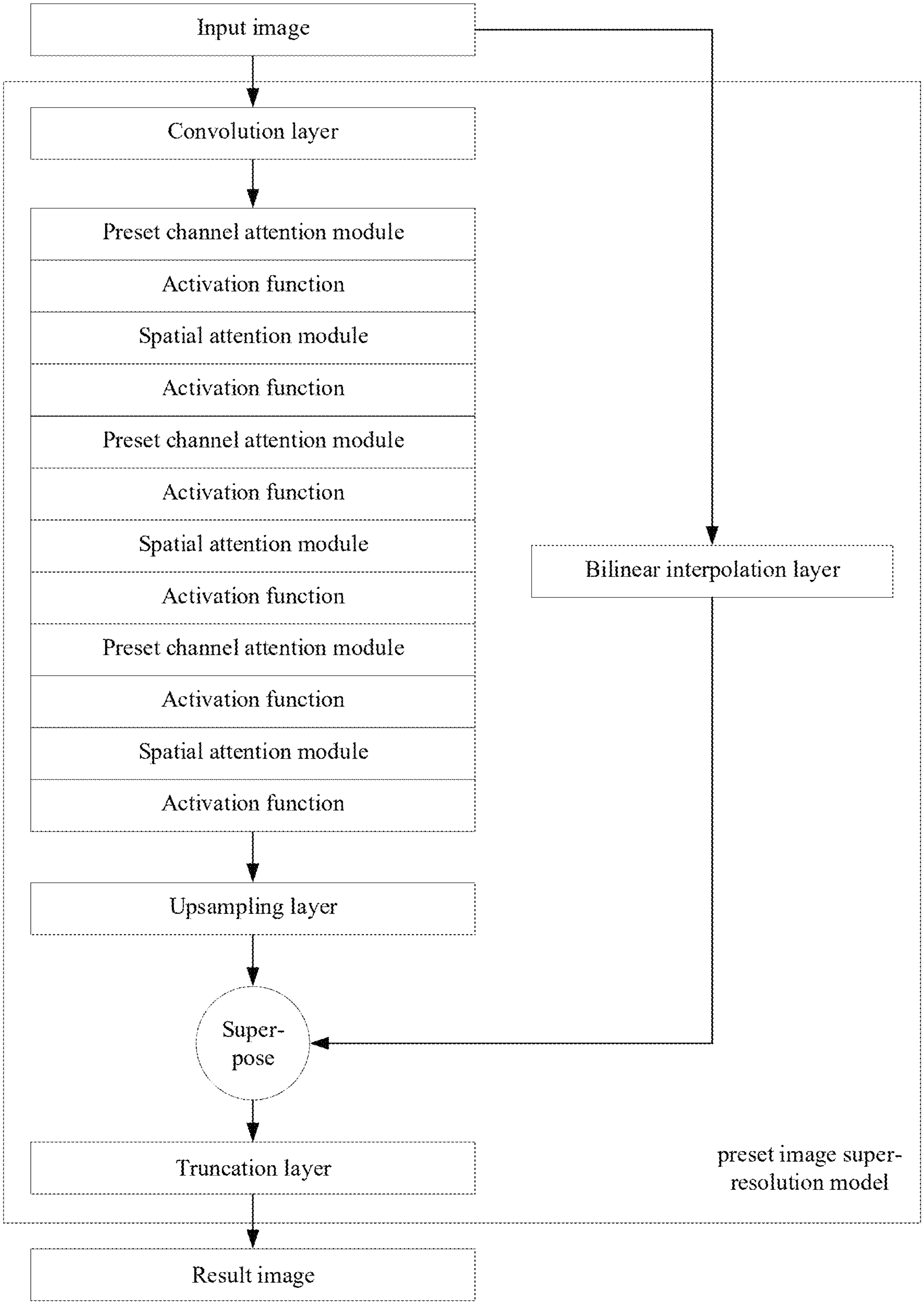
FIG. 3 is a schematic structural diagram of a preset image super-resolution network shown according to an embodiment of the present disclosure.

As shown in FIG. 3, FIG. 3 is a schematic structural diagram of a preset image super-resolution network shown according to an embodiment of the present disclosure.

The preset image super-resolution network may include a convolution layer, a preset channel attention module, an activation function, a spatial attention module, an upsampling layer, a bilinear interpolation layer, and a truncation layer.

The preset image super-resolution network may include two branches.

1) An input image (resolution thereof is the first resolution) is input into the convolution layer to extract features, and then the extracted features are input into three module combinations in series.

Each module combination may include one preset channel attention module, one activation function, one spatial attention module, and one activation functions in series.

Features output by the last module combination are input into the upsampling layer to obtain a first intermediate image (resolution thereof is the second resolution).

2) The input image is input into the bilinear interpolation layer to obtain a second intermediate image (resolution thereof is the second resolution).

Then, the first intermediate image and the second intermediate image may be superposed, and then values beyond a value range of an image pixel value may be corrected by the truncation layer to obtain a final result image (resolution thereof is the second resolution).

2. Method for Training the Preset Image Super-Resolution Network.

A specific method for training the preset image super-resolution network is not limited in the embodiments of the present disclosure.

In an optional embodiment, since the preset channel attention module in the preset image super-resolution network may configure the preset weight condition, when the preset image super-resolution network is trained, whether the preset weight condition is configured is not limited.

Optionally, when the preset image super-resolution network is specifically trained, the preset weight condition for training may be configured directly during the training.

Optionally, since the preset weight condition is mainly configured for reducing the data amount and may change as the requirement changes in a part of embodiments, configuring, when training, the preset weight condition may have an impact on an effect of training. Therefore, to improve the effect of training the preset image super-resolution network, when the preset image super-resolution network is trained, the preset weight condition may be not configured to perform screening of the result weights.

Correspondingly, after the training ends, the preset weight condition may be further configured for the trained preset image super-resolution network, and screening of the result weights may be configured to reduce the computing cost.

For convenience of description, an original image super-resolution network may be configured as a source of the preset image super-resolution network.

Optionally, the original image super-resolution network may be configured for: extracting image features from an input image with the first resolution, and outputting a result image with the second resolution according to the extracted image features.

Explanation of extracting the image features may refer to explanation of extracting the features from the preset image super-resolution network above.

Optionally, the original image super-resolution network may be specifically configured for extracting the image features based on an original channel attention module; where the original channel attention module may be configured for determining the initial weights for the channel images according to the input feature map, and outputting an original feature map according to the determined initial weights.

Explanation of the channel image and explanation of the initial weight may refer to the above.

The original channel attention module may not include the preset weight condition, and not perform the screening of the result weights.

The manner of outputting the original feature map according to the initial weights is not limited in the embodiments of the present disclosure.

Optionally, specifically, the original feature map may be obtained according to the products of the initial weights and the corresponding channel images; or convolution is further performed for the products of the initial weights and the corresponding channel images, through the convolution layer, to extract features to obtain the initial feature map.

Optionally, outputting the initial feature map according to the determined initial weight may include: obtaining corresponding single-channel feature maps by computing products of the determined initial weights with corresponding channel images respectively; and obtaining the initial feature map by stacking the obtained single-channel feature maps.

In this embodiment, the efficiency of computing the initial feature map may be improved by directly computing the products of the initial weights and the corresponding channel images.

Optionally, the original image super-resolution network may be firstly trained by using a sample set, then the preset weight condition is configured for the trained original image super-resolution network, to implement the screening of the result weights and obtain the preset image super-resolution network.

In this embodiment, the preset weight condition may be flexibly configured for the original image super-resolution network to meet different requirements.

3. Method for Determining the Preset Image Super-Resolution Network.

Regarding step S102 of determining the preset image super-resolution network that meets the super-resolution requirement, a specific method for determining the preset image super-resolution network is not limited in the embodiments of the present disclosure.

In an optional embodiment, the execution body may determine whether the preset image super-resolution network that meets the super-resolution requirement is deployed locally, or may determine whether the preset image super-resolution network capable of meeting the super-resolution requirement by changing a part of parameters or structures is deployed locally, or may determine whether the preset image super-resolution network that meets the super-resolution requirement can be obtained from devices other than the execution body.

Optionally, determining the preset image super-resolution network that meets the super-resolution requirement may include at least one of the following.

1) An original image super-resolution network that meets the super-resolution requirement is determined, and the original image super-resolution network is converted into the preset image super-resolution network. Specifically, this manner may be implemented by configuring the preset weight condition.

More specifically, the original image super-resolution network that meets the super-resolution requirement may be obtained locally or from a device other than the execution body.

2) The preset image super-resolution network that meets the super-resolution requirement is directly determined. Specifically, the preset image super-resolution network that meets the super-resolution requirement may be obtained locally or from the device other than the execution body.

3) The original image super-resolution network that meets a part of the super-resolution requirement is determined. For example, the super-resolution requirement may include an input-output resolution requirement and a computing power limit requirement. The original image super-resolution network that meets the input-output resolution requirement may be determined. Specifically, the original image super-resolution network that meets the input-output resolution requirement may be obtained locally or from the device other than the execution body.

Then, the preset image super-resolution network may be obtained through converting and configuring, such that the preset image super-resolution network meets all of the super-resolution requirement.

4) The preset image super-resolution network that meets a part of the super-resolution requirement is determined. For example, the super-resolution requirement may include an input-output resolution requirement and a computing power limit requirement. The preset image super-resolution network that meets the input-output resolution requirement may be determined. Specifically, the preset image super-resolution network that meets the input-output resolution requirement may be obtained locally or from the device other than the execution body.

Then, a new preset image super-resolution network may be obtained by updating the preset weight condition, such that the new preset image super-resolution network meets all of the super-resolution requirement.

In an optional embodiment, determining the preset image super-resolution network that meets the super-resolution requirement may include: determining an original image super-resolution network; and performing a preset process on the original image super-resolution network to obtain the preset image super-resolution network that meets the super-resolution requirement.

In this embodiment, the preset image super-resolution network may be obtained by performing the preset process on the original image super-resolution network, such that flexibility of determining the preset image super-resolution network may be improved, and the corresponding preset process may be conveniently performed according to the super-resolution requirement to obtain the preset image super-resolution network that meets the requirement.

In this embodiment, the original image super-resolution network is not limited, as long as the preset image super-resolution network that meets the super-resolution requirement may be obtained through the preset process.

Optionally, the original image super-resolution network may be configured for: extracting image features from an input image with the first resolution, and outputting a result image with the second resolution according to the extracted image features.

Optionally, the original image super-resolution network may be specifically configured for extracting the image features based on an original channel attention module.

Optionally, the original channel attention module may be configured for determining the initial weights for the channel images according to the input feature map, and outputting an original feature map according to the determined initial weights.

Explanation of the original channel attention module may refer to the above.

A specific manner of determining the original image super-resolution network is not limited in this embodiment. Optionally, the original image super-resolution network that meet or do not meet the super-resolution requirement may be determined. Specifically, the original image super-resolution network may be obtained locally or from the device other than the execution body.

Optionally, the original image super-resolution network that meets the super-resolution requirement may be determined, and subsequent converting may be performed according to actual requirements to configure the preset weight condition, to reduce the computing cost.

Optionally, the original image super-resolution network that does not meet the super-resolution requirement may also be determined. Specifically, the original image super-resolution network that do not meet the computing power limit requirement in the super-resolution requirement may be determined. For example, a computing power requirement of the original image super-resolution network is large, and the execution body itself is difficult to operate the original image super-resolution network. Therefore, the preset weight condition may be configured through the subsequent converting to reduce the computing cost and reduce the computing power requirement, such that the preset image super-resolution network that meets the super-resolution requirement may be obtained. The specific content may refer to the following explanation.

The specific manner of the preset process is also not limited in this embodiment.

Optionally, the preset process may include: converting one or more original channel attention modules in the original image super-resolution network into preset channel attention modules by configuring a preset weight condition for each of the original channel attention modules according to the super-resolution requirement, such that a preset image super-resolution network obtained by the converting meets the super-resolution requirement.

Optionally, for the determined original image super-resolution network that meets the super-resolution requirement, the preset process may include: configuring the preset weight condition for each of the one or more original channel attention modules in the original image super-resolution network, and converting the one or more original channel attention modules into the preset channel attention modules. Specifically, the preset weight condition may be configured according to the to-be-saved computing cost.

Optionally, the preset process may further include: amending execution logics in the original channel attention modules, such that the original channel attention modules execute corresponding logics of the preset channel attention modules, which specifically includes a manner of screening the result weights from the initial weights, and a manner of outputting the result feature map according to the result weights.

In the above embodiment, through the specific preset process, the original image super-resolution network may be quickly converted into the preset image super-resolution network, to improve the efficiency and flexibility of determining the preset image super-resolution network.

Regarding step S101 of determining the super-resolution requirement, the specific form of the super-resolution requirement is not limited, and the manner of determining the super-resolution requirement is also not limited in the embodiment of the present disclosure.

Optionally, the super-resolution requirement may be determined according to a user request, or may be determined according to device information.

In a specific example, the super-resolution requirement may be determined according to a computing resource allocation situation in the device information, or may be determined according to to-be-performed-super-resolution image information in the user request.

Optionally, the super-resolution requirement may further include a computing power limit requirement, so as to control the computing cost consumed by the image super-resolution. The super-resolution requirement may also include other requirements, for example, a super-resolution real-time requirement, a super-resolution efficiency requirement, etc.

The source and form of the computing power limit requirement is not limited in this embodiment.

Optionally, the computing power limit requirement may be determined according to computing resources of the execution body itself, or may be determined according to computing resources, that enable to be allocated to the image super-resolution, in the execution body.

Optionally, the form of the computing power limit requirement may include at least one of: an upper limit of the computing resources, an upper limit of the number of modules in the image super-resolution network, the number of to-be-screened-and-removed channel images, etc.

It is to be noted that the modules in the image super-resolution network may determine required computing power by computing, such that the computing power limit requirement may be met by reducing the number of the modules or improving a standard for screening the channel images. The modules here may include a preset channel attention module, a spatial attention module, a convolution layer, etc., in the image super-resolution network.

In an optional embodiment, the original image super-resolution network or the preset image super-resolution network may be determined according to the computing power limit requirement included in the super-resolution requirement.

Optionally, determining the original image super-resolution network may include: determining the original image super-resolution network that meets the super-resolution requirement.

Optionally, an original channel module number upper limit that meets the computing power limit requirement may be directly determined. Determining the original image super-resolution network may specifically include: determining an original channel module number upper limit according to the computing power limit requirement in the super-resolution requirement, and determining an original image super-resolution network that meets the super-resolution requirement. The number of the original channel attention modules included in the original image super-resolution network may be less than or equal to the original channel module number upper limit.

An original image super-resolution network, that the number of the original channel attention modules of the original image super-resolution network is less than or equal to the original channel module number upper limit, may be directly obtained, or a part of the original channel attention modules of the original image super-resolution network may be deleted until the computing power limit requirement is met.

In this embodiment, the computing power limit requirement may be met by limiting the number of the original channel attention modules, such that the efficiency of determining the preset image super-resolution network is improved.

Optionally, when converting, the converting may also be perform and the preset weight condition may also be configured according to the computing power limit requirement.

Optionally, converting the one or more original channel attention modules in the original image super-resolution network into the preset channel attention modules by configuring the preset weight condition for each of the original channel attention modules may specifically include: determining the number M of to-be-converted channel modules according to the computing power limit requirement in the super-resolution requirement; and converting M original channel attention modules in the original image super-resolution network into M preset channel attention modules by configuring the preset weight condition for each of the M original channel attention modules.

In this embodiment, the computing power limit requirement may be met by limiting the number of the to-be-converted original channel attention modules, such that the efficiency of determining the preset image super-resolution network is improved.

Optionally, converting the one or more original channel attention modules in the original image super-resolution network into the preset channel attention modules by configuring the preset weight condition for each of the original channel attention modules may specifically include: according to the computing power limit requirement in the super-resolution requirement, determining the number M of to-be-converted original channel attention modules and a channel image retention ratio for each of the to-be-converted original channel attention modules; and converting M original channel attention modules in the original image super-resolution network into M preset channel attention modules by configuring the preset weight condition for each of the M original channel attention modules according to a corresponding channel image retention ratio; where the preset weight condition may include: the sequence number of the initial weight being in a top N % where the initial weights are sorted in the sequence of absolute values from large to small, where N % is the corresponding channel image retention ratio.

Corresponding different channel image retention ratios may be configured for different original channel attention modules.

In this embodiment, the computing power limit requirement may be met by limiting the number of the to-be-converted original channel attention modules and the number of channel images retained by the converted preset channel attention modules, such that the efficiency of determining the preset image super-resolution network is improved.

In another optional embodiment, the preset image super-resolution network that meets the super-resolution requirement may also be directly determined.

Optionally, determining the preset image super-resolution network that meets the super-resolution requirement may specifically include: determining a preset channel module number upper limit according to the computing power limit requirement in the super-resolution requirement, and determining a preset image super-resolution network that meets the super-resolution requirement; where the number of preset channel attention modules included in the preset image super-resolution network may be less than or equal to the preset channel module number upper limit.

Specifically, the preset image super-resolution network that meets the super-resolution requirement may be implemented by deleting preset channel attention modules, or a preset image super-resolution network, that the number of preset channel attention modules of the preset image super-resolution network is less than or equal to the preset channel module number upper limit, may be directly obtained.

In this embodiment, the computing power limit requirement may be met by limiting the number of the preset channel attention modules, such that the efficiency of determining the preset image super-resolution network is improved.

Optionally, determining the preset image super-resolution network that meets the super-resolution requirement may specifically include: determining a channel image retention ratio for each of preset channel attention modules according to the computing power limit requirement in the super-resolution requirement, and determining a preset image super-resolution network that meets the super-resolution requirement; where for each preset channel attention module in the preset image super-resolution network, an initial weight that meets the preset weight condition for the preset channel attention module includes: the sequence number of the initial weight being in a top N % where the initial weights are sorted in the sequence from large to small, where N % is the corresponding channel image retention ratio.

Corresponding different channel image retention ratios may be configured for different preset channel attention modules.

Specifically, the preset image super-resolution network that meets the super-resolution requirement may be implemented by deleting preset channel attention modules, or may be implemented by updating the preset weight condition.

In this embodiment, the computing power limit requirement may be met by limiting the number of the preset channel attention modules and the number of channel images retained by the preset channel attention modules, such that the efficiency of determining the preset image super-resolution network is improved.

In addition, optionally, the number of other modules in the preset image super-resolution network may also be reduced according to the computing power limit requirement, for example, reducing the number of spatial attention modules and/or convolution layers.

It is to be noted that, since the preset weight condition may reduce channel images with a low importance degree, and have a controllable and lower impact on the effect of the image super-resolution, updating, according to the computing power limit requirement, the preset weight condition has a lower impact on the effect of the image super-resolution.

III. Regarding the Preset Image Super-Resolution Network for Extracting Image Features.

The specific manner for extracting the image features in the preset image super-resolution network is not limited in the embodiments of the present disclosure.

Optionally, the image features may be extracted by using manners, such as a convolution layer, a channel attention mechanism, a spatial attention mechanism, an activation function, a fully connected layer, etc.

In the process of extracting the image features, the preset image super-resolution network may extract the image features by using at least one of: a preset channel attention module, a spatial attention module, an activation function, a fully connected layer, a convolution layer, etc.

The combination, number, and sequence of these modules in the preset image super-resolution network are not limited in the embodiments of the present disclosure.

In an optional embodiment, the preset image super-resolution network may extract the image features by a convolution layer.

The form of the convolution layer is not limited in this embodiment.

Optionally, the convolution layer may include a plurality of convolution branches each extracting the image features from different angles and then synthesizing the image features, such that the effect of training the image super-resolution network is conveniently improved.

Optionally, different convolution branches may have different convolution kernels that may specifically have different convolution kernel values, different convolution kernel sizes, etc. For example, there are a convolution kernel of 2*2 and a convolution kernel of 3*3.

Optionally, the convolution branches may also be configured for extracting inter-pixel gradient features in a single direction, for example, a lateral direction, a longitudinal direction, an oblique direction, etc.

Figure 4:
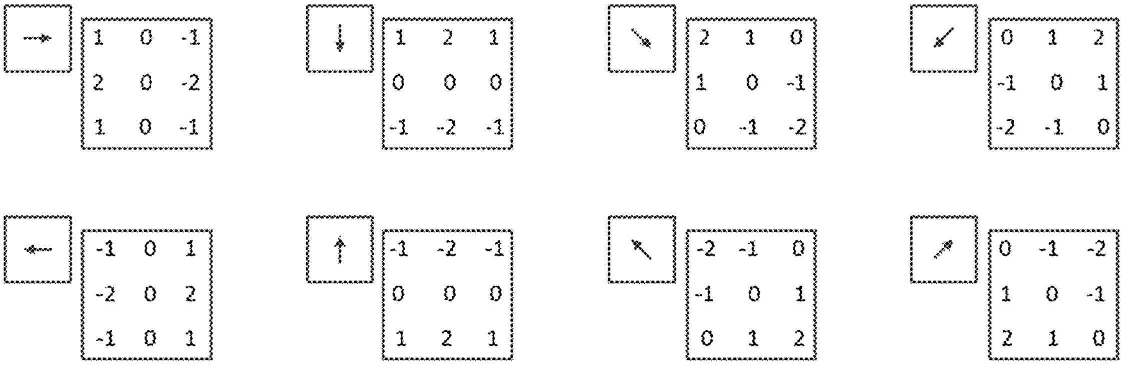
FIG. 4 is a schematic diagram of a direction convolution kernel shown according to an embodiment of the present disclosure.

For convenience of understanding, as shown in FIG. 4, FIG. 4 is a schematic diagram of a direction convolution kernel shown according to an embodiment of the present disclosure. FIG. 4 includes convolution kernels for extracting the inter-pixel gradient features in eight directions respectively.

Through different convolution branches, comprehensiveness of feature extraction may be improved, the effect of training the image super-resolution network may be improved, and the effect of the image super-resolution may be improved.

For the plurality of convolution branches, this embodiment may provide a manner of reducing computing cost.

During the training, parameters may be updated by maintaining the form of convolution branches. However, after the training ends, the parameters of the convolution branches may be fixed, and if the computing is performed respectively again in the form of convolution branches, the computing efficiency will be lower.

Therefore, after the training is completed, different convolution branches may be merged, and processing of each of the convolution branches may be implemented by a single convolution operation.

For convenience of implementing the merging operation, the sum of a result of each of the convolution branches may be limited.

Since the convolution computing operation is additive, the result of each of the convolution branches is summed, such that the convolution kernel of each of the convolution branches may be synthesized to obtain a single convolution kernel, to implement the processing of each of the convolution branches, and then the processing of each of the convolution branches may be implemented through a single convolution operation for the input feature to obtain the sum of the result of each of the convolution branches.

For convenience of understanding, in a specific example, the convolution layer may include two convolution branches, which are respectively represented as the following formulas: F1=K1*X+B1; F2=K2*X+B2.

F1 and F2 are outputs of the two convolution branches respectively, K1 and K2 are convolution kernels of the two convolution branches respectively, * represents a normal convolution operation, X is a same input of the two convolution branches, and B1 and B2 are offset coefficients of the two convolution branches respectively.

An overall output of the convolution layer may be represented by Ftotal, that is:

$$Ftotal = F1 + F2 = K1 * X + B1 + K2 * X + B2 = (K1 + K2) * X + (B1 + B2).$$

Therefore, merging process may be performed for the two convolution branches in the convolution layer to obtain a single convolution operation with a convolution kernel of (K1+K2) and an offset coefficient of (B1+B2).

For an example of other convolution layer including a plurality of convolution branches, a similar manner may also be used to prove that a single convolution operation may be obtained by the merging process.

In another specific example, the convolution layer may include two convolution branches, where one convolution branch may use a conventional convolution operation: F3=K3*X+B3.

The other convolution branch may achieve a plurality of convolution operations, taking two consecutive convolution operations as an example: F4=K4*(K4*X+B4)+B4.

An overall output of the convolution layer may be represented by Ftotal, that is:

$$Ftotal = F3 + F4 = K3 * X + B3 + K4 * (K4 * X + B4) + B4 = K3 * X + B3 + K4 * K4 * X + K4 * B4 + B4 = (K3 + K4 * K4) * X + (B3 + K4 * B4 + B4).$$

Therefore, the merging process may be performed for the two convolution branches in the convolution layer to obtain a single convolution operation with a convolution kernel of (K3+K4*K4) and an offset coefficient of (B3+K4*B4+B4).

For an example of other convolution layer including a plurality of convolution branches, a similar manner may also be used to prove that a single convolution operation may be obtained by the merging process.

In another specific example, the convolution layer may include two convolution branches, where one convolution branch may use a conventional convolution operation: $F5=K5*X+B5$.

Another convolution branch may achieve a plurality of convolution operations, taking two consecutive convolution operations as an example: $F6=K6\oplus(K6*X+B6)+B6$.

$\oplus$ represents a depthwise separable convolution operation (which may be understood as performing a single-channel convolution operation on each channel and then merging a plurality of channels).

An overall output of the convolution layer may be represented by Ftotal, that is:

$$\begin{aligned} Ftotal = F5 + F6 = K5*X + B5 + K6\oplus(K6*X + B6) + B6 = \\ K5*X + B5 + K6\oplus K6*X + K6\oplus B6 + B6 = \\ (K5 + K6\oplus K6)*X + (B5 + K6\oplus B6 + B6). \end{aligned}$$

Therefore, the merging process may be performed for the two convolution branches in the convolution layer to obtain a single convolution operation with a convolution kernel of $(K5+K6\oplus K6)$ and an offset coefficient of $(B5+K6\oplus B6+B6)$.

For an example of other convolution layer including a plurality of convolution branches, a similar manner may also be used to prove that a single convolution operation may be obtained by the merging process.

Certainly, in the above convolution operation, output weights, etc., of different convolution branches may also be introduced, which do not affect the merging process, or the above convolution operation may be converted into a single convolution operation.

Therefore, optionally, the preset image super-resolution network being trained includes an original convolution layer.

Optionally, the original convolution layer may be configured for extracting convolution features from the input feature map through at least two branches respectively to obtain at least two branch convolution feature maps, and outputting a sum of the obtained branch convolution feature maps.

In this embodiment, the manner of extracting the convolution features through each branch is not limited, and the convolution features may be specifically extracted by a manner of convolution.

In this embodiment, the sum of the results of the branches in the original convolutional layer may be limited, which facilitates subsequent merging process, thereby reducing the computing cost.

Optionally, at least one branch in the original convolution layer includes: a direction convolution layer configured for extracting inter-pixel gradient features in a preset direction.

Optionally, different branches may use convolution kernels of different sizes, or may use a direction convolution layer configured for extracting inter-pixel gradient features in different directions.

The original convolution layer may be in a form of a convolution layer including each of convolution branches, which is convenient for training.

In addition, in different original convolutional layers, the included direction convolutional layers may extract inter-pixel gradient features in the same or different directions. The embodiments of the present disclosure are not limited thereto.

In a specific example, different direction convolution layers extracting inter-pixel gradient features in different directions may alternatively be used in different original convolution layers.

For example, direction convolution layers in four directions, an upper direction, an upper right direction, a right direction, and a lower right direction may be used in the former original convolution layer; and direction convolution layers in four directions, a lower direction, a lower left direction, a left direction, and an upper left direction, may be used in the next original convolution layer, such that comprehensiveness of feature extraction may be improved, and the effect of training the image super-resolution network may be improved conveniently.

In this embodiment, by extracting the inter-pixel gradient features, the effect of training the image super-resolution network may be conveniently improved, and the effect of the image super-resolution may be improved.

In an optional embodiment, after the training is completed, the merging process may be performed on the original convolution layer, such that the original output of the original convolution layer may be obtained through a single convolution operation, thereby reducing the computing cost.

Optionally, the preset image super-resolution network may include a preset convolutional layer.

Optionally, the preset convolution layer may be obtained by performing a merging process on a trained preset image super-resolution network.

Optionally, the merging process may include: obtaining a corresponding preset convolution layer by performing merging operation on the at least two branches of the original convolution layer in the trained preset image super-resolution network.

Optionally, the preset convolution layer may be configured for performing a single convolution operation on the input feature map, and outputting a sum of at least two branch result feature maps in a corresponding original convolution layer.

In this embodiment, through the merging process, the computing cost of the original convolution layer may be reduced, and the efficiency of the image super-resolution may be improved.

In addition, optionally, the original image super-resolution network may include an original convolutional layer, such that in the process of training the original image super-resolution network, the original convolutional layer is trained and the merging process is implemented after the training ends to obtain the preset convolutional layer.

In an optional embodiment, the preset convolutional layer may be configured for extracting image features, and therefore, the preset image super-resolution network may include the preset convolutional layer.

In addition, the preset channel attention module may also extract the image features. Optionally, the preset channel attention module may also include a preset convolutional layer to extract the image features. In any one step of extracting the image features of the preset channel attention module, the preset convolutional layer may be used to extract image features.

Specifically, the preset channel attention module may firstly input the input feature map into the preset convolutional layer to extract the intermediate feature map, and then perform the pooling process and feature extraction for the intermediate feature map.

Optionally, the spatial attention module may also extract the image features. Optionally, the spatial attention module may also include a preset convolutional layer to extract the image features.

Optionally, an input of at least one preset channel attention module may include an output of the preset convolutional layer. The preset channel attention module may use the image features extracted by the preset convolutional layer as the input feature map.

Of course, other module, such as the spatial attention module, may also use the image features extracted by the preset convolutional layer as the input feature map.

In this embodiment, through the preset convolution layer and the preset channel attention module connected in series, the effect of the feature extraction may be improved, and the required computing power may be conveniently controlled.

IV. Application Scenario.

For ease of understanding, an embodiment of the present disclosure further provides an application embodiment.

Figure 5:
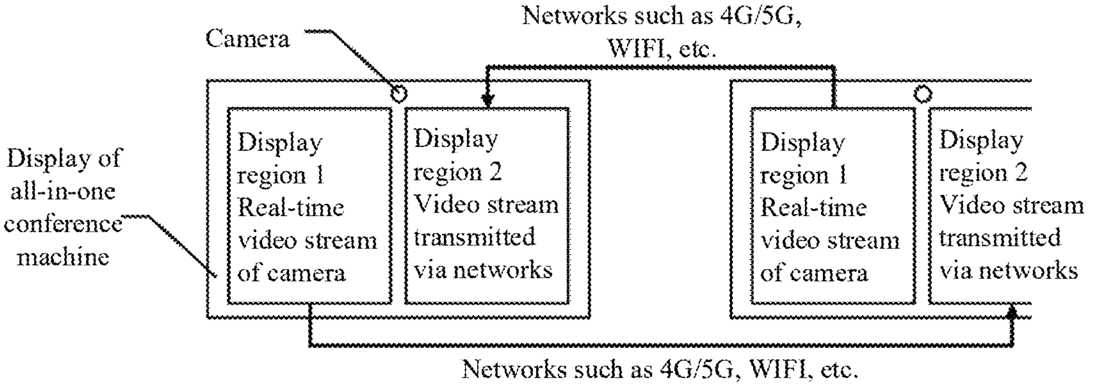
FIG. 5 is a schematic diagram of a video conference shown according to an embodiment of the present disclosure.

In a scenario of a video conference, as shown in FIG. 5, FIG. 5 is a schematic diagram of a video conference shown according to an embodiment of the present disclosure.

Taking a 2-person conference as an example, in FIG. 5, a display region 1 is a region displayed in a real-time stream of the current camera, and shooting content is an image of a video conference of the present person.

A display region 2 is of a real-time stream transmitted through a network, and content thereof is an image of a video conference of an opposite party.

Since the display region 1 is of a local video stream, the display region 1 may display original resolution clarity degree (for example, 4K ultrahigh definition resolution) of the current camera, with clear images.

However, due to a pressure on network transmission caused by a multi-person conference, to synchronize images of the video in real-time, resolution compression and bit rate compression have been often performed on the video stream of the opposite party, so the images are blurred and are not clear.

In this embodiment, a problem of unclearness caused by low resolution of the video stream of the opposite party is mainly solved.

The present embodiment may be applied to any other terminal/mobile terminal super-resolution scenario, for example, a terminal (a TV, an all-in-one conference machine, an electronic whiteboard, etc.) scenario, a mobile terminal (a mobile phone, a PAD, etc.) scenario.

In this embodiment, the preset image super-resolution network that meets the super-resolution requirement may be deployed on the terminal according to the super-resolution requirement, to achieve super-resolution of the images of the video conference of the opposite party, and improve the resolution and clarity degree.

The super-resolution requirement may include an input-output resolution, and a computing power limit requirement of the terminal itself.

For the deployed terminal, optionally, a device externally to the terminal may be selected to deploy the preset image super-resolution network that meets the super-resolution requirement. Since the device externally to the terminal often has more computing resources, a higher output resolution may be selected, to either improving the effect of the super-resolution, or improving the real-time of the super-resolution.

Specifically, for the all-in-one conference machine, under the situation that the cost is allowed and the super-resolution requirement is higher, an external super-resolution box may be used, and the preset image super-resolution network may be deployed on the super-resolution box.

Optionally, the preset image super-resolution network may also be directly deployed on the terminal.

Specifically, for the all-in-one conference machine, under the situation that the cost is considered and the super-resolution requirement is lower, an external super-resolution box may be used, and the preset image super-resolution network may be deployed on a board card of the all-in-one conference machine. On one hand, no additional device cost is added, and the image super-resolution may also be performed through the preset image super-resolution network, with a certain effect of improving the image quality.

The specific computing power limit requirement may be explained by taking a conference super-resolution scenario of the all-in-one conference machine as an example.

In practical applications, the adaptive number of modules may be configured according to the computing power requirement of the terminal.

It is configured that computing power that can be provided by the hardware of the all-in-one conference machine to a super-resolution model is Mp (no specific unit is limited herein, for example, the unit is Flops, MACS, Tops, etc., only unit computing of an algorithm keeps consistent), and it is configured that in the preset image super-resolution network, values of computing power required by all other modules except the preset channel attention modules are Mo, a value of computing power required by a single preset channel attention module is Mc respectively, and the number of the preset channel attention modules is csN, then the number of to-be-retained preset channel attention modules or the number of to-be-retained channel images in the preset channel attention modules may be computed correspondingly, such that the computing power of the updated overall preset image super-resolution network is less than or equal to Mp.

Corresponding to the above method embodiment, an embodiment of the present disclosure further provides an apparatus embodiment.

Figure 6:
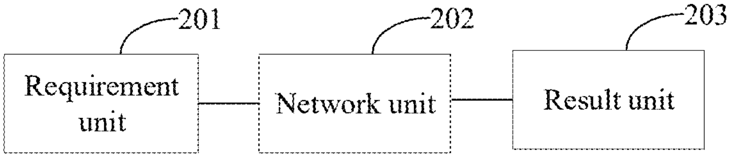
FIG. 6 is a schematic structural diagram of an image super-resolution apparatus shown according to an embodiment of the present disclosure.

As shown in FIG. 6, FIG. 6 is a schematic structural diagram of an image super-resolution apparatus shown according to an embodiment of the present disclosure.

The apparatus may include the following units.

A requirement unit 201 is configured for determining a super-resolution requirement including a requirement for converting an image with a first resolution into an image with a second resolution greater than the first resolution.

A network unit 202 is configured for determining a preset image super-resolution network that meets the super-resolution requirement.

A result unit 203 is configured for inputting a to-be-performed-super-resolution image with the first resolution into the preset image super-resolution network, to obtain a result image with the second resolution output by the preset image super-resolution network.

The preset image super-resolution network may be configured for extracting image features based on the preset channel attention module.

The preset channel attention module may be configured for: determining one or more initial weights for one or more channel images according to an input feature map, taking one or more initial weights that meet a preset weight condition as one or more result weights, and outputting a result feature map according to the determined result weights.

Optionally, a minimum absolute value of the determined result weights is greater than or equal to a maximum absolute value of the initial weights that do not meet the preset weight condition.

Optionally, an initial weight that meets the preset weight condition includes at least one of:

an absolute value of the initial weight being greater than a preset weight lower limit;

a sequence number of the initial weight being less than a preset sequence number where the initial weights are sorted in a sequence of absolute values from large to small; or the sequence number of the initial weight being in a top N % where the initial weights are sorted in the sequence of absolute values from large to small.

Optionally, the preset channel attention module is configured for:

obtaining corresponding single-channel feature maps by computing products of the determined result weights with corresponding channel images respectively; and obtaining the result feature map by stacking the obtained single-channel feature maps.

Optionally, the preset channel attention module is configured for determining the initial weights for the channel images by at least one of:

extracting features from the input feature map, to obtain the initial weights for the channel images;

performing a pooling process on the input feature map to obtain a pooling result, and extracting features from the obtained pooling result to obtain the initial weights for the channel images; or extracting the features for the input feature map, performing the pooling process on the extracted features to obtain a pooling result, and extracting features from the obtained pooling result to obtain the initial weights for the channel images.

Optionally, the pooling process includes at least one of:

performing a global maximum pooling process;

performing a global average pooling process; or performing the global maximum pooling process and the global average pooling process respectively to obtain two pooling features, and then stacking the obtained two pooling features.

Optionally, the network unit 202 is configured for:

determining an original image super-resolution network, where the original image super-resolution network is configured for extracting image features from an input image with the first resolution and outputting a result image with the second resolution according to the extracted image features; and performing a preset process on the original image super-resolution network to obtain the preset image super-resolution network that meets the super-resolution requirement.

Optionally, the original image super-resolution network is specifically configured for extracting the image features based on an original channel attention module;

the original channel attention module is configured for determining the initial weights for the channel images according to the input feature map, and outputting an original feature map according to the determined initial weights; and the preset process includes: converting one or more original channel attention modules in the original image super-resolution network into preset channel attention modules by configuring a preset weight condition for each of the original channel attention modules according to the super-resolution requirement, such that a preset image super-resolution network obtained by the converting meets the super-resolution requirement.

Optionally, the super-resolution requirement further includes a computing power limit requirement;

the network unit 202 is configured for:

determining an original channel module number upper limit according to the computing power limit requirement in the super-resolution requirement, and determining an original image super-resolution network that meets the super-resolution requirement;

the number of the original channel attention modules included in the original image super-resolution network is less than or equal to the original channel module number upper limit.

Optionally, the super-resolution requirement further includes a computing power limit requirement;

the preset process includes:

determining a number M of to-be-converted channel modules according to the computing power limit requirement in the super-resolution requirement; and converting M original channel attention modules in the original image super-resolution network into M preset channel attention modules by configuring the preset weight condition for each of the M original channel attention modules.

Optionally, the super-resolution requirement further includes a computing power limit requirement;

the preset process includes:

according to the computing power limit requirement in the super-resolution requirement, determining a number M of to-be-converted original channel attention modules and a channel image retention ratio for each of the to-be-converted original channel attention modules; and converting M original channel attention modules in the original image super-resolution network into M preset channel attention modules by configuring the preset weight condition for each of the M original channel attention modules according to a corresponding channel image retention ratio;

where an initial weight that meets the preset weight condition includes: a sequence number of the initial weight being in a top N % where the initial weights are sorted in a sequence of absolute values from large to small, where N % is the corresponding channel image retention ratio.

Optionally, the super-resolution requirement further includes a computing power limit requirement;

the network unit 202 is configured for:

determining a preset channel module number upper limit according to the computing power limit requirement in the super-resolution requirement, and determining a preset image super-resolution network that meets the super-resolution requirement;

where the number of preset channel attention modules included in the preset image super-resolution network is less than or equal to the preset channel module number upper limit.

Optionally, the super-resolution requirement further includes a computing power limit requirement;

the network unit 202 is configured for:

determining a channel image retention ratio for each of preset channel attention modules according to the computing power limit requirement in the super-resolution requirement, and determining a preset image super-resolution network that meets the super-resolution requirement;

where for each preset channel attention module in the preset image super-resolution network, an initial weight that meets the preset weight condition for the preset channel attention module includes: a sequence number of the initial weight being in a top N % where the initial weights are sorted in a sequence from large to small, where N % is the corresponding channel image retention ratio.

Optionally, the preset image super-resolution network being trained includes an original convolution layer;

the original convolution layer is configured for extracting convolution features from the input feature map through at least two branches respectively to obtain at least two branch convolution feature maps, and outputting a sum of the obtained branch convolution feature maps.

Optionally, at least one branch in the original convolution layer includes: a direction convolution layer configured for extracting inter-pixel gradient features in a preset direction.

Optionally, the preset image super-resolution network includes a preset convolutional layer;

the preset convolution layer is obtained by performing a merging process on a trained preset image super-resolution network;

the merging process includes: obtaining a corresponding preset convolution layer by performing merging operation on the at least two branches of the original convolution layer in the trained preset image super-resolution network;

the preset convolution layer is configured for performing a single convolution operation on the input feature map, and outputting a sum of at least two branch result feature maps in a corresponding original convolution layer.

Optionally, an input of at least one preset channel attention module includes the output of the preset convolutional layer.

Optionally, the preset image super-resolution network is configured for:

extracting image features from an input image with the first resolution; obtaining a first intermediate image with the second resolution according to the extracted image features; performing a preset computing operation on the input image with the first resolution, to obtain a second intermediate image with the second resolution; and outputting the result image with the second resolution according to a sum of the first intermediate image and the second intermediate image.

Optionally, the above apparatus may be applied to a computing device, and the preset image super-resolution network may be deployed in the computing device.

The specific explanation may refer to the above method embodiment.

An embodiment of the present disclosure further provides a computer device. The computer device at least includes a memory, a processor, and a computer program stored in the memory and executable by the processor. The processor, when executing the computer program, implements the above any one method embodiment.

An embodiment of the present disclosure further provides an electronic device, including: at least one processor and a memory connected communicatively to the at least one processor, where, the memory stores instructions that are executable by the at least one processor, and the instructions, when executed by the at least one processor, enable the at least one processor to perform the above any one method embodiment.

Figure 7:
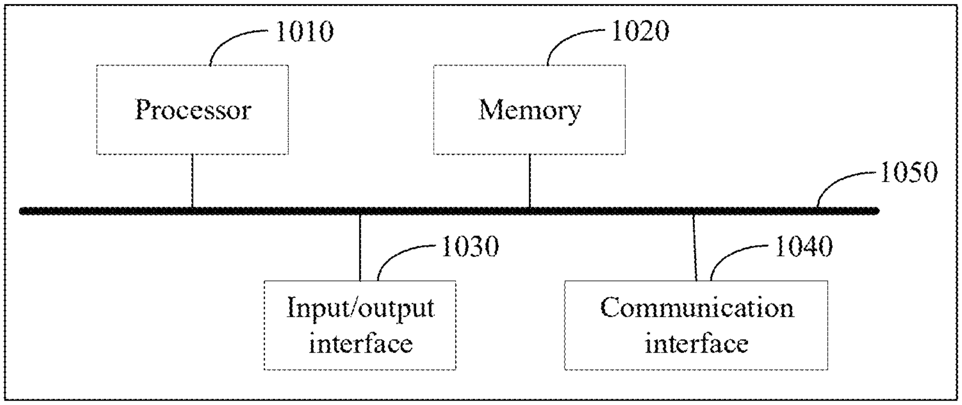
FIG. 7 is a schematic diagram of a hardware structure of a computer device for configuring the method of an embodiment of the present disclosure, shown according to an embodiment of the present disclosure.

FIG. 7 is a schematic diagram of a hardware structure of a computer device for configuring the method of an embodiment of the present disclosure, shown according to an embodiment of the present disclosure. The device may include: a processor 1010, a memory 1020, an input/output interface 1030, a communication interface 1040, and a bus 1050. The processor 1010, the memory 1020, the input/output interface 1030, and the communication interface 1040 implement communication connections with each other inside the device through the bus 1050.

The processor 1010 may be implemented in a form of a general-purpose central processing unit (CPU), a microprocessor, an application specific integrated circuit (ASIC), one or more integrated circuits, etc., and may be configured for executing related programs to implement the technical solutions provided in the embodiments of the present disclosure.

The memory 1020 may be implemented in a form of a ROM (read only memory), an RAM (random access memory), a static storage device, a dynamic storage device, etc. The memory 1020 may store an operating system and other application programs. When implementing the technical solutions provided in the embodiments of the present disclosure in a manner of software or firmware, related program codes are stored in the memory 1020 and invoked and executed by the processor 1010.

The input/output interface 1030 is configured for being connected to an input/output module to implement information input and output. The input/output module may be used as a component (not shown in figures) configured in the device, or may be externally connected to the device to provide a corresponding function. The input device may include a keyboard, a mouse, a touch screen, a microphone, various sensors, etc., and the output device may include a display, a speaker, a vibrator, an indicator light, etc.

The communication interface 1040 is configured for being connected to a communication module (not shown in the figures), to implement communication interaction between the current device and other devices. The communication module may implement the communication in a wired manner (for example, a USB, a network cable, etc.), or may implement the communication in a wireless manner (for example, a mobile network, a WIFI, a Bluetooth, etc.).

The bus 1050 includes a path to transfer information between various components (for example, the processor 1010, the memory 1020, the input/output interface 1030, and the communication interface 1040) of the device.

It should be noted that although the above device only includes the processor 1010, the memory 1020, the input/output interface 1030, the communication interface 1040, and the bus 1050, in a specific implementation process, the device may further include other components necessary to implement a normal operation. In addition, those skilled in the art may understand that the above device may only include components necessary to implement the solutions of the embodiments of the present disclosure, and does not necessarily include all components shown in the figures.

An embodiment of the present disclosure provides further a computer-readable storage medium, storing a computer program. The computer program, when executed by a processor, implements the above any one method embodiment.

An embodiment of the present disclosure provides further a computer-readable storage medium, storing a computer program. The computer program, when executed by a processor, implements the above any one method embodiment.

The computer-readable medium includes permanent and non-permanent, removable and non-removable media, in which information storage may be implemented by any method or technology. The information may be computer-readable instructions, data structures, modules of programs, or other data. Examples of the computer storage medium include, but are not limited to, a phase change random access memory (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disc read-only memory (CD-ROM), a digital versatile disc (DVD) or other optical storage, a magnetic cartridge tape, a magnetic disk storage, or other magnetic storage devices or any other non-transmission medium. The computer storage medium may be configured for storing information that may be accessed by the computing device. According to the definition herein, the computer-readable medium does not include the transitory storage computer-readable media, such as modulated data signals and carriers.

From the above description of the implementations, those skilled in the art may clearly understand that the embodiments of the present disclosure may be implemented by means of software and the necessary universal hardware platform. Based on such understanding, the technical solution of the embodiments of the present disclosure essentially or the portion thereof contributing to the prior art may be embodied in the form of a software product. The computer software product may be stored in a storage medium, such as an ROM/RAM, a magnetic disk, an optical disk, etc., and includes several instructions such that a computer device (may be a personal computer, a server, or a network equipment, etc.) implements the method described in various embodiments or certain portions of the embodiments of the present disclosure.

The system, apparatus, module, or unit illustrated in the above embodiments may be specifically implemented by a computer chip or an entity, or implemented by a product having a certain function. A typical implementation device is a computer. A specific form of the computer may be a personal computer, a laptop computer, a cellular phone, a camera phone, a smart phone, a personal digital assistant, a media player, a navigation device, an email transceiver device, a game console, a tablet computer, a wearable device, or a combination of any of these devices.

All of the embodiments in the description are described in a progressive manner, and identical or similar parts in various embodiments can refer to one another. In addition, the description for each embodiment focuses on the differences from other embodiments. In particular, the apparatus embodiment is described briefly, since it is substantially similar to the method embodiment, and the related contents can refer to the description of the method embodiment. The apparatus embodiment described above are merely schematic. The modules described as separate components may or may not be physically separate, and functions of various modules may be implemented in a same or more software and/or hardware when implementing the solutions of the embodiments of the present disclosure. A part or all of modules may also be selected according to actual needs to achieve the purpose of the solutions in these embodiments. Those skilled in the art may understand and implement other embodiments without a creative work.

The above descriptions are only specific implementations of the embodiments of the present disclosure. It should be noted that those skilled in the art may also make several improvements and modifications without departing from principles of the embodiments of the present disclosure, and these improvements and modifications should also be regarded as protection of the embodiments of the present disclosure.

In the present disclosure, the terms “first” and “second” are used only for descriptive purposes and should not be understood as indicating or implying relative importance. The term “multiple” refers to two or more, unless explicitly defined otherwise.

Those skilled in the art will easily come up with other implementation solutions of the present disclosure after considering the description and practicing the present disclosure disclosed herein. The present disclosure aims to cover any variations, uses, or adaptive changes of the present disclosure, which follow general principles of the present disclosure and include common knowledge or customary technical means in the technical field not disclosed in the present disclosure. The description and embodiments are only considered exemplary, and the true scope and spirit of the present disclosure are indicated by the following claims.

It should be understood that the present disclosure is not limited to the precise structure already described above and shown in the drawings, and various modifications and changes may be made without departing from its scope. The scope of the present disclosure is limited only by the appended claims.

The invention claimed is:

1. An image super-resolution method, comprising:

determining a super-resolution requirement comprising a requirement for converting an image with a first resolution into an image with a second resolution greater than the first resolution; and determining a preset image super-resolution network that meets the super-resolution requirement;

inputting a to-be-performed-super-resolution image with the first resolution into the preset image super-resolution network, to obtain a result image with the second resolution output by the preset image super-resolution network;

wherein the preset image super-resolution network is configured for extracting one or more image features based on a preset channel attention module;

the preset channel attention module is configured for: determining one or more initial weights for one or more channel images according to an input feature map, taking one or more initial weights that meet a first preset weight condition as one or more result weights, and outputting a result feature map according to the determined result weights;

wherein the super-resolution requirement further comprises a computing power limit requirement; wherein a form of the computing power limit requirement comprises at least one of: an upper limit of computing resources, an upper limit of a number of modules in an image super-resolution network, or a number of to-be-screened-and-removed channel images;

wherein determining the preset image super-resolution network that meets the super-resolution requirement comprises:

determining a channel image retention ratio for each of preset channel attention modules according to the computing power limit requirement in the super-resolution requirement, and determining a preset image super-resolution network that meets the super-resolution requirement;

wherein, for each preset channel attention module in the preset image super-resolution network, an initial weight that meets the first preset weight condition for the preset channel attention module comprises: a sequence number of the initial weight being in a top N % where the initial weights are sorted in a sequence from large to small, wherein N % is the corresponding channel image retention ratio;

wherein different channel image retention ratios are configured for different preset channel attention modules.

2. The method of claim 1, wherein a minimum absolute value of the determined result weights is greater than or equal to a maximum absolute value of the initial weights that do not meet the first preset weight condition.

3. The method of claim 1, wherein an initial weight that meets the first preset weight condition comprises at least one of:

an absolute value of the initial weight being greater than a preset weight lower limit;

a sequence number of the initial weight being less than a preset sequence number where the initial weights are sorted in a sequence of absolute values from large to small; or the sequence number of the initial weight being in a top N % where the initial weights are sorted in the sequence of absolute values from large to small.

4. The method of claim 1, wherein outputting the result feature map according to the determined result weights comprises:

obtaining corresponding single-channel feature maps by computing products of the determined result weights with corresponding channel images respectively; and obtaining the result feature map by stacking the obtained single-channel feature maps.

5. The method of claim 1, wherein determining the one or more initial weights for the one or more channel images according to the input feature map comprises at least one of:

extracting features from the input feature map, to obtain the initial weights for the channel images;

performing a pooling process on the input feature map to obtain a pooling result, and extracting features from the obtained pooling result to obtain the initial weights for the channel images; or extracting features from the input feature map, performing a pooling process on the extracted features to obtain a pooling result, and extracting features from the obtained pooling result to obtain the initial weights for the channel images.

6. The method of claim 5, wherein the pooling process comprises at least one of:

performing a global maximum pooling process;

performing a global average pooling process; or performing the global maximum pooling process and the global average pooling process respectively to obtain two pooling features, and then stacking the obtained two pooling features.

7. The method of claim 1, wherein determining the preset image super-resolution network that meets the super-resolution requirement comprises:

determining an original image super-resolution network, wherein the original image super-resolution network is configured for extracting image features from an input image with the first resolution and outputting a result image with the second resolution according to the extracted image features; and performing a preset process on the original image super-resolution network to obtain the preset image super-resolution network that meets the super-resolution requirement.

8. The method of claim 7, wherein the original image super-resolution network is specifically configured for extracting the image features based on an original channel attention module;

wherein the original channel attention module is configured for determining the initial weights for the channel images according to the input feature map, and outputting an original feature map according to the determined initial weights; and wherein the preset process comprises: converting one or more original channel attention modules in the original image super-resolution network into preset channel attention modules by configuring a second preset weight condition for each of the original channel attention modules according to the super-resolution requirement, such that a preset image super-resolution network obtained by the converting meets the super-resolution requirement.

9. The method of claim 8, wherein determining the original image super-resolution network comprises:

determining an original channel module number upper limit according to the computing power limit requirement in the super-resolution requirement, and determining an original image super-resolution network that meets the super-resolution requirement;

wherein a number of the original channel attention modules comprised in the original image super-resolution network is less than or equal to the original channel module number upper limit.

10. The method of claim 8, wherein converting the one or more original channel attention modules in the original image super-resolution network into the preset channel attention modules by configuring the second preset weight condition for each of the original channel attention modules, comprises:

determining a number M of to-be-converted channel modules according to the computing power limit requirement in the super-resolution requirement; and converting M original channel attention modules in the original image super-resolution network into M preset channel attention modules by configuring the second preset weight condition for each of the M original channel attention modules.

11. The method of claim 8, wherein converting the one or more original channel attention modules in the original image super-resolution network into the preset channel attention modules by configuring the second preset weight condition for each of the original channel attention modules, comprises:

according to the computing power limit requirement in the super-resolution requirement, determining a number M of to-be-converted original channel attention modules and a channel image retention ratio for each of the to-be-converted original channel attention modules; and converting M original channel attention modules in the original image super-resolution network into M preset channel attention modules by configuring the second preset weight condition for each of the M original channel attention modules according to a corresponding channel image retention ratio;

wherein an initial weight that meets the second preset weight condition comprises: a sequence number of the initial weight being in a top N % where the initial weights are sorted in a sequence of absolute values from large to small, wherein N % is the corresponding channel image retention ratio.

12. The method of claim 1, wherein determining the preset image super-resolution network that meets the super-resolution requirement comprises:

determining a preset channel module number upper limit according to the computing power limit requirement in the super-resolution requirement, and determining a preset image super-resolution network that meets the super-resolution requirement;

wherein a number of preset channel attention modules comprised in the preset image super-resolution network is less than or equal to the preset channel module number upper limit.

13. The method of claim 1, wherein the preset image super-resolution network comprises an original convolution layer;

wherein the original convolution layer is configured for extracting convolution features from the input feature map through at least two branches respectively to obtain at least two branch convolution feature maps, and outputting a sum of the obtained branch convolution feature maps.

14. The method of claim 13, wherein at least one branch in the original convolution layer comprises: a direction convolution layer configured for extracting inter-pixel gradient features in a preset direction.

15. The method of claim 13, wherein the preset image super-resolution network comprises a preset convolution layer;

wherein the method further comprises: performing a merging process on a trained preset image super-resolution network to obtain the preset convolution layer;

wherein the merging process comprises: obtaining a corresponding preset convolution layer by performing merging operation on the at least two branches of the original convolution layer in the trained preset image super-resolution network;

wherein the preset convolution layer is configured for performing a single convolution operation on the input feature map, and outputting a sum of at least two branch result feature maps in a corresponding original convolution layer.

16. The method of claim 15, wherein an input of at least one preset channel attention module comprises the output of the preset convolution layer.

17. The method of claim 1, wherein the preset image super-resolution network is configured for:

extracting image features from an input image with the first resolution and obtaining a first intermediate image with the second resolution according to the extracted image features;

performing a preset computing operation on the input image with the first resolution, to obtain a second intermediate image with the second resolution; and outputting the result image with the second resolution according to a sum of the first intermediate image and the second intermediate image.

18. An electronic device, comprising:

at least one processor; and a memory connected communicatively to the at least one processor, wherein, the memory stores instructions that are executable by the at least one processor, and the instructions, when executed by the at least one processor, enable the at least one processor to:

determine a super-resolution requirement comprising a requirement for converting an image with a first resolution into an image with a second resolution greater than the first resolution; and determine a preset image super-resolution network that meets the super-resolution requirement;

input a to-be-performed-super-resolution image with the first resolution into the preset image super-resolution network, to obtain a result image with the second resolution output by the preset image super-resolution network;

wherein the preset image super-resolution network is configured for extracting one or more image features based on a preset channel attention module;

the preset channel attention module is configured for: determining one or more initial weights for one or more channel images according to an input feature map, taking one or more initial weights that meet a first preset weight condition as one or more result weights, and outputting a result feature map according to the determined result weights;

wherein the super-resolution requirement further comprises a computing power limit requirement; wherein a form of the computing power limit requirement comprises at least one of: an upper limit of computing resources, an upper limit of a number of modules in an image super-resolution network, or a number of to-be-screened-and-removed channel images;

wherein the at least one processor is configured to:

determine a channel image retention ratio for each of preset channel attention modules according to the computing power limit requirement in the super-resolution requirement, and determine a preset image super-resolution network that meets the super-resolution requirement;

wherein, for each preset channel attention module in the preset image super-resolution network, an initial weight that meets the first preset weight condition for the preset channel attention module comprises: a sequence number of the initial weight being in a top N % where the initial weights are sorted in a sequence from large to small, wherein N % is the corresponding channel image retention ratio;

wherein different channel image retention ratios are configured for different preset channel attention modules.

19. A computer-readable storage medium storing a computer program, wherein the computer program, when executed by a processor, implements operations of:

determining a super-resolution requirement comprising a requirement for converting an image with a first resolution into an image with a second resolution greater than the first resolution; and determining a preset image super-resolution network that meets the super-resolution requirement;

inputting a to-be-performed-super-resolution image with the first resolution into the preset image super-resolution network, to obtain a result image with the second resolution output by the preset image super-resolution network;

wherein the preset image super-resolution network is configured for extracting one or more image features based on a preset channel attention module;

the preset channel attention module is configured for: determining one or more initial weights for one or more channel images according to an input feature map, taking one or more initial weights that meet a first preset weight condition as one or more result weights, and outputting a result feature map according to the determined result weights;

wherein the super-resolution requirement further comprises a computing power limit requirement; wherein a form of the computing power limit requirement comprises at least one of:

an upper limit of computing resources, an upper limit of a number of modules in an image super-resolution network, or a number of to-be-screened-and-removed channel images;

wherein the computer program, when executed by the processor, implements operations of:

determining a channel image retention ratio for each of preset channel attention modules according to the computing power limit requirement in the super-resolution requirement, and determining a preset image super-resolution network that meets the super-resolution requirement;

wherein, for each preset channel attention module in the preset image super-resolution network, an initial weight that meets the first preset weight condition for the preset channel attention module comprises: a sequence number of the initial weight being in a top N % where the initial weights are sorted in a sequence from large to small, wherein N % is the corresponding channel image retention ratio;

wherein different channel image retention ratios are configured for different preset channel attention modules.

* * * * *